(12) United States Patent
Tong et al.

(10) Patent No.: US 10,067,307 B2
(45) Date of Patent: Sep. 4, 2018

(54) FIBER OPTIC SPLICE PROTECTION DEVICE AND METHOD FOR MOUNTING THE SAME

(71) Applicant: ADC Telecommunications (Shanghai) Distribution Co., Ltd., Shanghai (CN)

(72) Inventors: Zhaoyang Tong, Shanghai (CN); Jiangzhen Xia, Shanghai (CN); Lei Liu, Shanghai (CN); Longzhou Qi, Shanghai (CN); Xingjun Cheng, Shanghai (CN)

(73) Assignee: ADC Telecommunications (Shanghai) Distribution Co., Ltd., Shanghai ( * ) Notice: Subject to any disclaimer, the term of this patent is extended or adjusted under 35 U.S.C. 154(b) by 0 days.

(21) Appl. No.: 15/304,326

(22) PCT Filed: Apr. 15, 2015

(86) PCT No.: PCT/CN2015/076682
§ 371 (c)(1),
(2) Date: Oct. 14, 2016

(87) PCT Pub. No.: WO2015/158268
PCT Pub. Date: Oct. 22, 2015

(65) Prior Publication Data
US 2017/0038547 A1    Feb. 9, 2017

(30) Foreign Application Priority Data
Apr. 15, 2014   (CN) .......................... 2014 1 0150782

(51) Int. Cl.
*G02B 6/44* (2006.01)
*G02B 6/255* (2006.01)

(52) U.S. Cl.
CPC ......... *G02B 6/4446* (2013.01); *G02B 6/2558* (2013.01); *G02B 6/44* (2013.01); *G02B 6/4471* (2013.01)

(58) Field of Classification Search
USPC ........................................................ 385/135
See application file for complete search history.

(56) References Cited

U.S. PATENT DOCUMENTS 5,519,804 A * 5/1996 Burek ................. G02B 6/3878
                                                                    385/134
5,684,911 A    11/1997 Burgett
(Continued)

FOREIGN PATENT DOCUMENTS

CN           2867366 Y     2/2007
CN         101504479 A     8/2009
(Continued)

OTHER PUBLICATIONS

International Search Report for corresponding International Patent Application No. PCT/CN2015/076682 dated Aug. 24, 2015, 4 pgs.
(Continued)

*Primary Examiner* — Eric Wong
(74) *Attorney, Agent, or Firm* — Merchant & Gould P.C.

(57) ABSTRACT

Disclosed is a fiber optic splice protection device, comprising: a closure including a cover and a chassis; and at least one cable fixer for fixing cables to be spliced to the chassis of the closure. Wherein the cable fixer is a separate member separated from the chassis, and is removably mounted in the chassis of the closure; and all strength members of the cables to be spliced are previously fixed to the cable fixer before the cable fixer is mounted to the chassis of the closure. Therefore, it is possible that strength members of the cables to be spliced are once time secured to the chassis of the closure of the fiber optic splice protection device, so as to easy to
(Continued)

implement rapid on-site installation. Further, the fiber optic splice protection device has higher mechanical strength.

17 Claims, 23 Drawing Sheets

(56) References Cited

U.S. PATENT DOCUMENTS

| | | | |
|---|---|---|---|
| 5,824,961 A | 10/1998 | Burek et al. | |
| 6,081,644 A | 6/2000 | Stateczny et al. | |
| 6,269,214 B1 | 1/2001 | Naudin et al. | |
| 7,603,018 B2 | 10/2009 | Mullaney et al. | |
| 7,738,761 B2 | 6/2010 | Mullaney et al. | |
| 8,929,708 B2* | 1/2015 | Pimentel | G02B 6/4441 |
| | | | 385/135 |
| 9,423,029 B2 | 8/2016 | Coenegracht et al. | |
| 2004/0013387 A1 | 1/2004 | Wakileh et al. | |
| 2009/0058018 A1 | 3/2009 | Mullaney et al. | |
| 2009/0110361 A1 | 4/2009 | Yamada | |
| 2010/0054689 A1 | 3/2010 | Mullaney et al. | |
| 2010/0092147 A1 | 4/2010 | Desard et al. | |
| 2015/0117829 A1* | 4/2015 | Allen | G02B 6/4454 |
| | | | 385/135 |
| 2015/0268435 A1* | 9/2015 | Blackwell, Jr. | G02B 6/4454 |
| | | | 385/135 |
| 2017/0031123 A1 | 2/2017 | Tong et al. | |
| 2017/0131498 A1 | 5/2017 | Tong et al. | |

FOREIGN PATENT DOCUMENTS

| | | |
|---|---|---|
| CN | 101900856 A | 12/2010 |
| CN | 102062913 A | 5/2011 |
| CN | 102073112 A | 5/2011 |
| CN | 102841414 A | 12/2012 |
| CN | 202676969 U | 1/2013 |
| CN | 202904081 | 4/2013 |
| CN | 103383484 A | 6/2013 |
| CN | 203149170 A | 8/2013 |
| CN | 203773116 U | 8/2014 |
| CN | 203773117 U | 8/2014 |
| CN | 203773118 U | 8/2014 |
| EP | 2 012 155 A1 | 1/2009 |
| WO | 97/27655 A1 | 7/1997 |
| WO | 2009/045689 A2 | 4/2009 |
| WO | 2013/091716 A1 | 6/2013 |
| WO | 2013/117484 A2 | 8/2013 |

OTHER PUBLICATIONS

Extended European Search Report for Application No. 15779919.8 dated Nov. 7, 2017.

* cited by examiner

FIBER OPTIC SPLICE PROTECTION DEVICE AND METHOD FOR MOUNTING THE SAME This application is a National Stage Application of PCT/CN2015/076682, filed 15 Apr. 2015, which claims benefit of Serial No. 201410150782.7, filed 15 Apr. 2014 in China and which applications are incorporated herein by reference. To the extent appropriate, a claim of priority is made to each of the above disclosed applications.

FIELD OF TECHNOLOGY

The present invention relates to a fiber optic splice protection device.

BACKGROUND

In the optical communication network, because of the limited length of the cable and requirement of branching and cross-connecting of the cable on the transmission line, it need to splice the cable and protect the splice so as to ensure the splice can withstand external factors, such as changes in temperature, humidity and mechanical drawing, etc., to realize work with all weather. The usual practice is to use cable splicing device to provide conditions for splicing, branching and cross-connecting a cable and realize integrity protection for the splice. Overhead cable, straight-through connection, branch and cross-connection of a pipeline often utilize the way of cable splice device to meet the protection needs of the internet connection between a cable main trunk cable and a wiring cable network. Cable splicing devices are generally required to have features, such as high mechanical strength, good sealing performance, good corrosion resistance, convenient splice, and supporting repeatedly turned on and so on. However, there are some shortcomings in present cable splicing device, such as bulky, inconvenient operation and high cost.

Existing fiber optic splice protection device comprises a cover and a chassis. A fixing device of a cable strength member, a slot of fiber optic splice protection jacket and a cable fastening tape are integrally formed with the chassis. Seal locking between the cover and the chassis is made by way of a seal component and a screw. Shortcoming of the existing Cable splicing device is that it is required to fix the cable strength members in the chassis one by one cable so as to make on-site installation inconvenient. At the same time, it also makes on-site installation inconvenient that the cover and the chassis are fixed by a plurality of screws. Further, in the existing fiber optic splice protection device, there is structure for managing the fiber optic jacket, resulting in the phenomenon of winding and messy of the fiber optic jacket and the fiber optic.

SUMMARY

The purpose of the present invention is to solve the above-mentioned prior art problems and drawbacks of at least one aspect.

One object of the present invention is to provide a fiber optic splice protection device, which can fix a cable to be spliced at a one-time to a chassis of a closure of a fiber optic splice protection device, so as to realize on-site rapid installation.

Another object of the present invention is to provide a fiber optic splice protection device, a cover of the closure of which can be easily turned on repeatedly, and good sealing performance can be achieved between the cover of the closure and the chassis of the closure.

Another object of the present invention is to provide a fiber optic splice protection device having a structure for managing the fiber optic jacket so as to avoid the phenomenon of winding and messy of the fiber optic jacket and the fiber optic.

Another object of the present invention is to provide a fiber optic splice protection device, with simple structure, small size and low cost.

Another object of the present invention is to provide a fiber optic splice protection device with high mechanical strength, excellent corrosion resistance.

According to one aspect of the present invention, there is provided a fiber optic splice protection device, comprising: a closure including a cover and a chassis; and at least one cable fixer for fixing cables to be spliced to the chassis of the closure, wherein the cable fixer is a separate member separated from the chassis, and is removably mounted in the chassis of the closure; and all strength members of the cables to be spliced are previously fixed to the cable fixer before the cable fixer is mounted to the chassis of the closure.

According to an exemplary embodiment of the present invention, each of the cable fixer comprises a strength member fixation unit for fixing the strength members of the cables to be spliced.

According to another exemplary embodiment of the present invention, the strength member fixation unit comprises cylindrical projections and threaded fasteners. The cylindrical projections project from surface of the cable fixer, threaded bores extending along axial direction of the cylindrical projections and strength member holes penetrating through the threaded bores along radial direction of the cylindrical projections are formed on the cylindrical projections, the strength members of the cable penetrate through the strength member holes. The threaded fasteners are screwed into the threaded bores of the cylindrical projection for fixing the strength members penetrated through the strength member holes to the cylindrical projections.

According to another exemplary embodiment of the present invention, each of the cable fixers further includes fastening strips. The fastening strips bound the outer sheath of the cable to ends of the cable fixer.

According to another exemplary embodiment of the present invention, each of the cable fixers has an elongated body. Grooves for cable extending along the longitudinal direction of the elongated body are respectively formed in two ends of the elongated body. The outer sheaths of the cable are accommodated the grooves for cable. Necks inwardly contracted along width direction of the elongated body are respectively formed at two ends of the elongated body. The fastening strips are positioned at the neck, and bound the outer sheath of the cable to the neck.

According to another exemplary embodiment of the present invention, the surface of the grooves for cable is uneven surface so as to increase frictional holding force.

According to another exemplary embodiment of the present invention, intermediate portion of the elongated body is a flat portion, and its height is lower than that of two ends of the elongated body, so that projected positioning edges are formed at two ends of the intermediate portion of the elongated body. The positioning edges are used for determining length of the outer sheath of the cable fixed on the cable fixer.

According to another exemplary embodiment of the present invention, the pair of cylindrical projection is formed at the intermediate portion of the elongated body According to another exemplary embodiment of the present invention, the unit is mounted to the chassis 200 of the closure by screws.

According to another exemplary embodiment of the present invention, a plurality of fixation holes are formed on the intermediate portion of the elongate body, threaded bores corresponding to a plurality of fixation holes are formed on bottom surface of the chassis of the closure respectively. Bolts pass through the fixation holes of the elongate body and screw into the threaded bores of the chassis so as to fix the cable fixer to the chassis of the closure.

According to another exemplary embodiment of the present invention, a strength member fixation unit comprises: a box-shaped accommodating portion and a clamp. The box-shaped accommodating portion is formed on the surface of the cable fixer, the box-shaped accommodating portion has four walls projecting from the surface of the cable fixer, and strength member holes are formed on the end wall of the box-shaped accommodating portion, a first groove for strength member is formed on the bottom surface of the box-shaped accommodating portion, the strength members of the cables penetrates through the strength member holes and receives in the first groove for strength member. The clamp is accommodated in the box-shaped accommodating portion and is fastened to bottom of the box-shaped accommodating portion by the screws, so as to squeeze the strength members penetrated through the strength member holes of the box-shaped accommodating portion into the first groove for strength member.

According to another exemplary embodiment of the present invention, threaded bores are formed on bottom surface of the box-shaped accommodating portion, and fixing holes are formed on the clamps, screws pass through the fixing hole of the clamps and are screwed into the threaded bores of the box-shaped accommodating portion, so as to fasten the clamps to bottom of the box-shaped accommodating portion.

According to another exemplary embodiment of the present invention, a second groove for strength member is also formed on the clamps. The strength members are squeezed between the first groove for strength member and the second groove for strength member.

According to another exemplary embodiment of the present invention, the surfaces of the first groove for strength member and/or the second groove for strength member are uneven surfaces so as to increase friction holding force for the strength members.

According to another exemplary embodiment of the present invention, a strength member fixation unit comprises: a box-shaped accommodating portion formed on the surface of the cable fixer, the box-shaped accommodating portion has four walls projecting from the surface of the cable fixer, and strength member holes are formed on the end wall of the box-shaped accommodating portion, a first groove for strength member is formed on the bottom surface of the box-shaped accommodating portion, the strength members of the cables penetrates through the strength member holes and are accommodated in the first groove for strength member; and a clamp accommodated in the box-shaped accommodating portion and is fastened to bottom of the box-shaped accommodating portion by the screw, so as to squeeze the strength members penetrated through the strength member holes of the box-shaped accommodating portion into the first groove for strength member, wherein the clamps includes a first block and a second block, the first block and the second block are mutually pivotally connected together, and the first block is used to individually squeeze and fix the strength members of the first cable of the cables to be spliced, the second block is used to individually squeeze and fix the strength members of the second cable of the cables to be spliced.

According to another exemplary embodiment of the present invention, threaded bores are formed on bottom surface of the box-shaped accommodating portion and fixing holes are formed on the clamps, and screws pass through the fixing hole of the clamps and screw into the threaded bores of the box-shaped accommodating portion, so as to fasten the clamps to bottom of the box-shaped accommodating portion.

According to another exemplary embodiment of the present invention, a second groove for strength member is formed on the clamp, the strength members are squeezed between the first groove for strength member and the second groove for strength member.

According to another exemplary embodiment of the present invention, surfaces of the first groove for strength member and/or the second groove for strength member are uneven surfaces so as to increase friction holding force for the strength members.

According to another exemplary embodiment of the present invention, the fiber optic splice protection device comprises a plurality of cable fixers for fixing cables to be spliced to the chassis of the closure.

According to another exemplary embodiment of the present invention, a method for mounting a fiber optic splice protection device is provided, comprising:

providing a cable fixer, which is separated from a chassis of a closure of the fiber optic splice protection device, fixing strength members and outer sheath of the cables to be spliced to the cable fixers;

fixing the cable fixer previously fixed with the cables to be spliced to the chassis of the closure; and closing a cover of the closure to the chassis of the closure.

According to another exemplary embodiment of the present invention, a fiber optic splice protection device is provided, comprising: a closure including a cover and a chassis; and a fiber routing management unit, mounted on the chassis of the closure, wherein the fiber routing management unit comprises: a bottom sheet; flexible clippers, which are removably mounted on top of the bottom sheet; and a resilient biasing member, mounted on the chassis of the closure, for applying elastic biasing force to the bottom sheet, wherein the bottom sheet is pressed against cable jackets of the cables to be spliced under the action of the elastic biasing member for preventing from winding and messy of the cable jackets; and wherein fiber optics of the cables to be spliced wind above the bottom sheet and along a no bending loss path defined by the flexible clippers, and are restrained to an appropriate location in order by the flexible clippers.

According to another exemplary embodiment of the present invention, the elastic biasing member is torque spring, a pair of mutually facing mounting shafts are formed on one side of the bottom of the bottom sheet, and a pair of torque spring are respectively sets on a pair of mounting shafts.

According to another exemplary embodiment of the present invention, a slot for cable jacket is formed on bottom surface of the chassis of the closure; cable jackets are placed in the slot and are pressed below the bottom sheet.

According to another exemplary embodiment of the present invention, the bottom sheet may be a flexible sheet-like member.

According to another exemplary embodiment of the present invention, the fiber routing management unit further includes a flexible spacer, the flexible spacer covers on the cable jackets, and the bottom sheet is pressed on the flexible spacer.

According to another exemplary embodiment of the present invention, a plurality of protruded connector sheet are formed on upper surface of the bottom sheet; flexible clippers comprise legs and a plurality of teeth-like portion located at upper end of the leg portion; insertion holes are formed in lower end of the legs, the connector sheet are inserted into the inserting holes, so that the flexible clippers are assembled to the bottom sheet.

According to another exemplary embodiment of the present invention, a plurality of flexible clippers are provided at each of the bottom sheets, and teeth-like portions of adjacent two flexible clippers are alternately arranged.

According to another exemplary embodiment of the present invention, a first flexible clipper and second flexible clippers are mounted at each of the bottom sheets, and a first flexible clipper and second flexible clippers are spaced and faced with each other.

According to another exemplary embodiment of the present invention, the first flexible clipper is provided at outer side of the chassis near the closure, and the second flexible clipper is disposed at inner side of the first flexible clippers.

According to another exemplary embodiment of the present invention, a plurality of first teeth-like portions are only formed at one side of the first flexible clipper facing the second flexible clippers; and a plurality of second teeth-like portions are only formed at one side of the second flexible clipper facing the first flexible clippers.

According to another exemplary embodiment of the present invention, a plurality of first teeth-like portions are only formed at one side of the first flexible clipper facing the second flexible clippers; and a plurality of second teeth-like portions are formed both at one side of the second flexible clipper facing the first flexible clippers and another side facing away from the first flexible clippers.

According to another exemplary embodiment of the present invention, a third flexible clipper is equipped on each of the bottom sheet, the third flexible clipper is arranged inside of the second flexible clipper, and a plurality of third teeth-like portions are only formed on one side of the third flexible clipper facing the second flexible clippers.

According to another exemplary embodiment of the present invention, two pairs of fiber routing management units are mounted in the chassis of the closure, in which one pair of fiber routing management units are arranged in the middle of the longitudinal two ends of the chassis, and the other pair fiber routing management unit are arranged in the middle of the transverse two ends of the chassis.

According to another exemplary embodiment of the present invention, a row of holder is formed in the middle of the chassis of the closure for holding fiber optic splice protective jacket.

According to another exemplary embodiment of the present invention, a method for mounting a fiber optic splice protection device is provided, comprising:

providing a cable fixer, which is separated from a chassis of a closure of the fiber optic splice protection device, fixing strength members and outer sheath of the cables to be spliced to the cable fixers;

fixing the cable fixer previously fixed with the cables to be spliced to the chassis of the closure;

placing cable jackets in cable jacket slots, and pressing a bottom sheet of a fiber routing management units against the cable jackets; and closing a cover of the closure to the chassis of the closure.

The method above further comprises the step of covering a flexible spacer on the cable jackets prior to pressing the bottom sheet against the cable jackets.

According to another exemplary embodiment of the present invention, a fiber optic splice protection device, comprising: a closure including a cover and a chassis; wherein a circle of groove is formed on mating edge of four walls of one of the cover and the chassis, and an elastic sealing member is placed in the groove; a circle of projection is formed on mating edge of four walls of another of the cover and the chassis; the cover is locked on the chassis in the way of locking, when the cover is locked on the chassis, the projection is pressed against the resilient seal and is embedded into the groove in order to achieve the seal locking between the cover and the chassis.

According to another exemplary embodiment of the present invention, the circle of groove is formed on upper mating edge of four walls of the chassis, and the circle of projections is formed on lower mating edge of four walls of the cover.

According to another exemplary embodiment of the present invention, at least one side of the cover and the chassis are locked to each other by a locking device.

According to another exemplary embodiment of the present invention, the cover and one side of the chassis are pivotally connected together by a hinge, and the cover and the other side of the chassis are mutually locked together through locking device.

According to another exemplary embodiment of the present invention, the cover and one side of the chassis is pivotally connected together by a hinge, and the cover and the other side of the chassis are mutually locked together through locking device.

According to another exemplary embodiment of the present invention, the locking means is a snap structure, and the snap structure comprising: a resilient hook formed on the cover; and a notch formed in the chassis, wherein when the elastic hook is inserted and snapped into the notch, the cover and chassis are locked together.

According to another exemplary embodiment of the present invention, the locking means is a cam locking mechanism, the eccentric wheel locking mechanism comprises: a snapping plate, connected to the cover; a sliding plate slidably mounted on the snapping plate and may slide along the snapping plate; a rotating circular plate rotatably mounted on the sliding plate; an eccentric cam member, connected to the rotating circular plate and offset from the center of the rotating circular plate by a predetermined distance, and the eccentric cam member is joined to the notch formed on the snapping plate; a shaft member connected to the lower end of the sliding plate; and a slot formed on the chassis, the shaft member is retained to the slot, wherein the eccentric cam member may move between a locked position locking the cover and the chassis, and an unlocked position releasing the cover and chassis, when the rotating circular plate is rotated; wherein when the eccentric cam member moves toward the locked position, the eccentric cam member drives the sliding plate and the snapping plate to move in a direction for closing to each other, so as to apply tension force to the cover and the chassis for achieving the locking between the cover and the chassis; and wherein the eccentric cam member drives the sliding plate and the snapping plate to moves toward a direction for separating from each other so as to release the cover and the chassis when the eccentric cam member is moving toward the unlocked position.

According to another exemplary embodiment of the present invention, a rotating circular plate is connected to a rotating wrench, for applying a rotational force to the rotating circular plate.

According to another exemplary embodiment of the present invention, an insertion hole is formed on rotating circular plate, for inserting force arm tool into the insertion hole so as to impart rotational force to the rotating circular plate.

According to another exemplary embodiment of the present invention, the eccentric cam member has disk-shape and has a diameter smaller than that of the rotating circular plate.

According to another exemplary embodiment of the present invention, the eccentric cam member has oval-shape, and its major-axis length is less than the diameter of the rotating circular plate.

According to another exemplary embodiment of the present invention, a pair of rib projections is formed on side of the chassis, and the sliding plate and the snapping plate of each cam locking mechanism are located between corresponding pair of projecting ribs.

According to another exemplary embodiment of the present invention, the slot is formed on the lower end of each pair of projecting ribs; two ends of the shaft member are locked into the slot.

According to another exemplary embodiment of the present invention, grooves for cable are formed on the side wall of the chassis; the cables to be spliced are accommodated in the cable receiving slots.

According to another exemplary embodiment of the present invention, the outer side wall of the chassis is formed with a holder knob.

According to another exemplary embodiment of the present invention, a number of mutually crossing longitudinal and transverse strength members are formed on the outer surface of the cover.

According to another exemplary embodiment of the present invention, a ruler is provided on the strength member, to provide on-site installation measurement function for measuring length.

According to another exemplary embodiment of the present invention, a method for mounting a fiber optic splice protection device is provided, comprising:

providing a cable fixer, which is separated from a chassis of a closure of the fiber optic splice protection device, fixing strength members and outer sheath of the cables to be spliced to the cable fixers;

fixing the cable fixer previously fixed with the cables to be spliced to the chassis of the closure;

placing a seal into a groove of the chassis; and closing a cover of the closure to the chassis of the closure.

The difference between the present invention and the prior art is to simplify the design structure of a fiber optic splice protection device, so that on-site splicing and protecting operation becomes easy and fast. On-site operators will strip cable until length of each part is a desired fixed length, the cable is fixed to a strength member fixation unit of the cable fixer, and then the cable is fixed to corresponding position in the cable fixer by a lashing member, and then the jacket cables are arranged chassis groove of the splice device located below a fiber routing management unit, the exposed primary coated optical fibers are inserted into fiber optic splice protective jackets, the cables are striped, cleaned, cut and then spliced, after that, the protective jackets protecting the splice of the cable are performed necessary processing (such as thermal), and then, the remain cables are accommodated in the fiber routing management unit, while the fiber optic splice protective jackets are sequentially disposed within the corresponding groove of the fiber optic splice protection device. The groove mates with the protective jacket in mechanical fitting manner, and the groove is component integrated with the chassis of the closure. At least two the fiber routing management units are installed on the chassis, with two basic functions: firstly, a restricted space formed between the fiber routing management unit and the groove of the chassis is used to place the cable jacket/outgoing optical fiber of the cable, and separate it from the remain fiber of the spliced portion; secondly, the fiber routing management units serves as a device of the chassis, increasing the fiber routing space of the cable and facilitating to fix the position of the cable so as to consequently place the cable in the splice device. The closure of the fiber optic splice protection device includes a cover and a chassis, a seal filled in the slot between the cover and the chassis is used to lock and seal by pressing the cover and the chassis, without some special tools are used to achieve the seal. Therefore, dependence on the profession of the works is reduced; complete protection of the splice is performed by simply operation of molting, routing and closing the optical fiber in two cables. When some spliced optical fiber need to be maintained, the closure of the cover and the chassis may be released by a simply tool, and after the maintenance required is finished, the cover may be closed again to achieve complete protection.

Other objects and advantages of the present invention will become apparent, and can help to have a thorough understanding of the present invention by the following description of the invention with reference to the accompanying drawings made.

DETAILED DESCRIPTION OF PREFERRED EMBODIMENTS OF THE INVENTION

Figure 1:
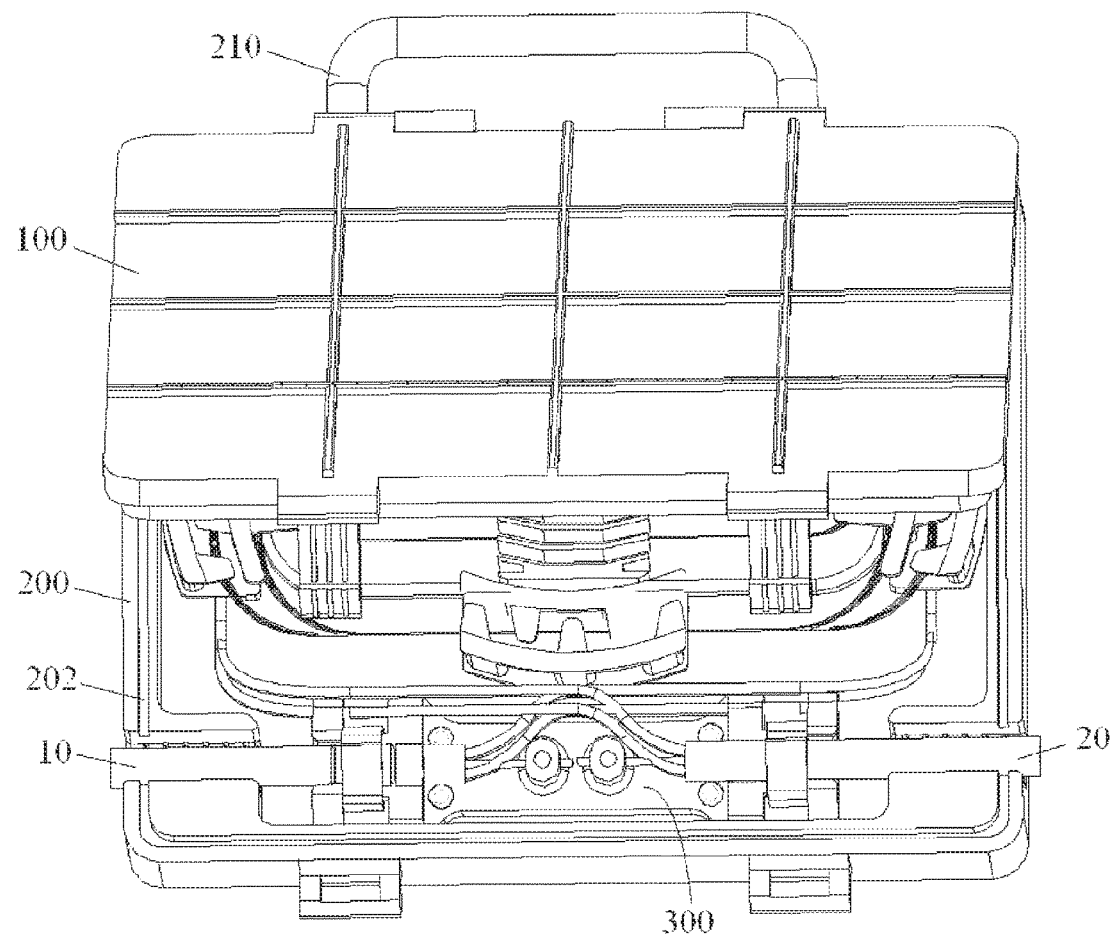
FIG. 1 shows a perspective schematic view of a fiber optic fiber optic splice protection device according to an exemplary embodiment of the present invention.

Specific embodiments of the present invention will be further described hereinafter in detail in conjunction with the attached drawings. In the specification, the same or similar reference numerals indicate the same or similar parts. The following embodiments are intended to illustrate the present invention, but not to limit scopes of the present invention.

According to a general concept of the present invention, there is provided a fiber optic splice protection device, comprising: a closure including a cover 100 and a chassis 200; and at least one cable fixer 300 for fixing cables to be spliced 10, 20 to the chassis 200 of the closure, wherein the cable fixer 300 is a separate member separated from the chassis 200, and is removably mounted in the chassis 200 of the closure; and all strength members of the cables to be spliced 10, 20 are previously fixed to the cable fixer 300 before the cable fixer 300 is mounted to the chassis 200 of the closure.

FIG. 1 shows a perspective schematic view of a fiber optic fiber optic splice protection device according to an exemplary embodiment of the present invention;

As shown in FIG. 1, the closure including the cover 100 and the chassis 200. At least one cable fixer 300 is mounted in the chassis 200 for fixing cables to be spliced 10, 20 to the chassis 200 of the closure.

Figure 4:
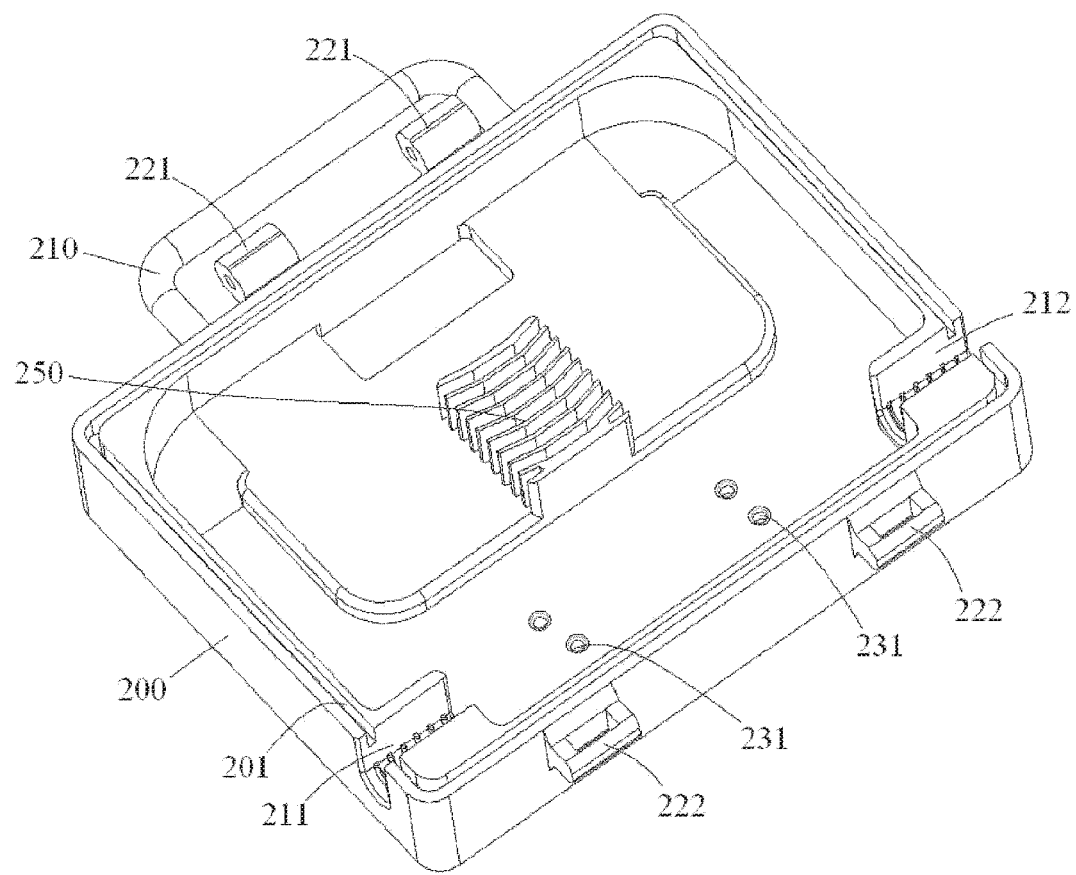
FIG. 4 shows a perspective view of the chassis of the fiber optic splice protection device in FIG. 1.
Figure 5A:
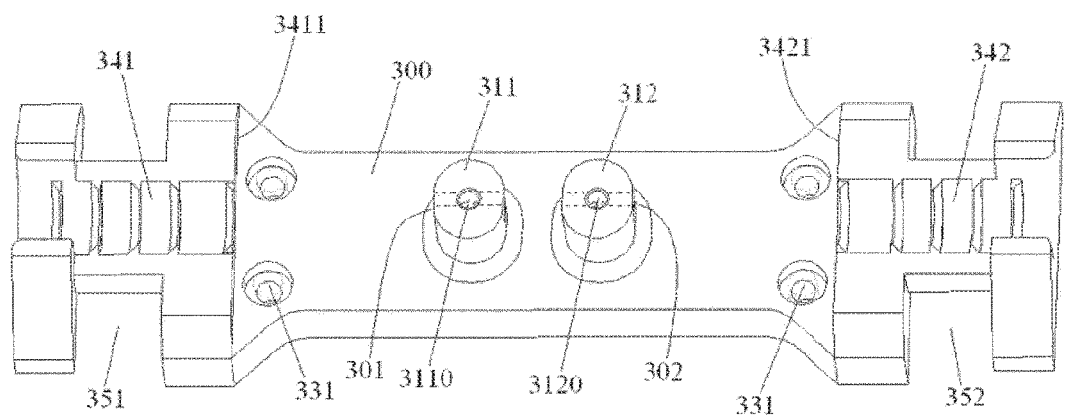
FIG. 5A shows a perspective schematic view of the cable fixer of the fiber optic splice protection device.
Figure 5B:
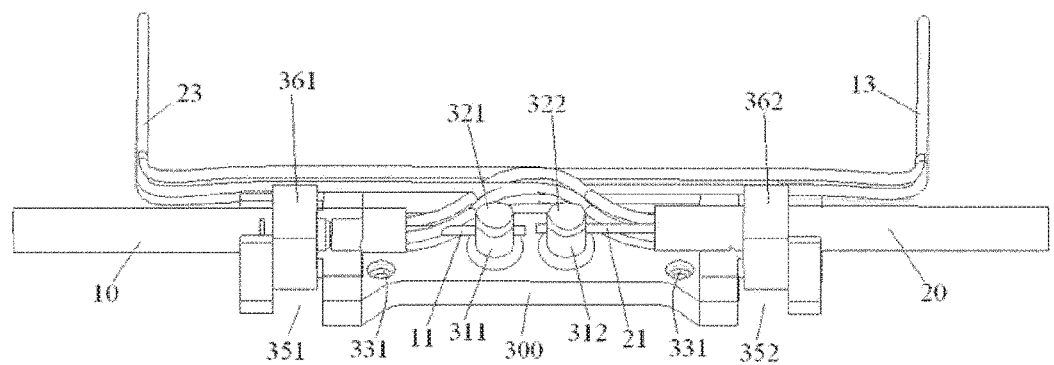
FIG. 5B shows a schematic view of previously fixing a strength member of the cable to be spliced and an outer sheath to the cable fixer.

FIG. 4 shows a perspective view of the chassis 200 of the fiber optic splice protection device in FIG. 1; FIG. 5A shows a perspective schematic view of the cable fixer 300 of the fiber optic splice protection device in FIG. 1; FIG. 5B shows a schematic view of previously fixing a strength members 11, 21 of the cable to be spliced 10, 20 and an outer sheath to the cable fixer 300.

Figure 2:
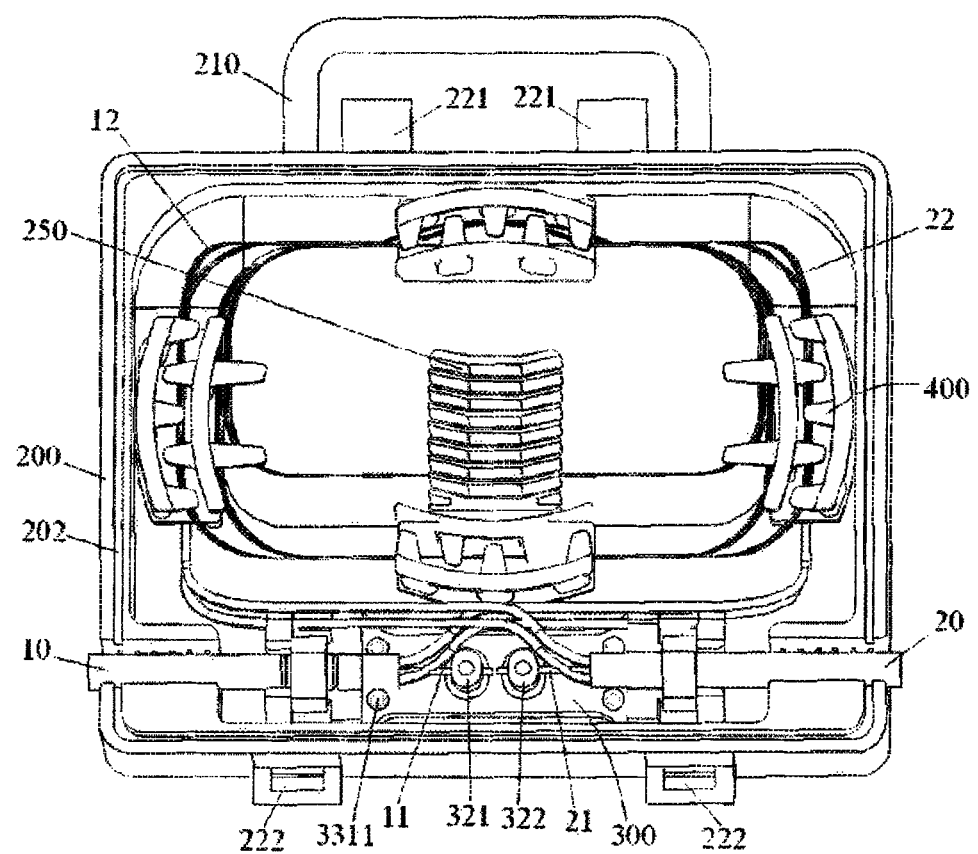
FIG. 2 shows a schematic diagram of a chassis of the fiber optic splice protection device in FIG. 1 and a cable fixer and a fiber routing management unit mounted on the chassis.

As shown in FIGS. 4, 5A and 5B, the cable fixer 300 is a separate member separated from the chassis 200, and is removably mounted in the chassis 200 of the closure. All strength members 11, 21 of the cables to be spliced 10, 20 are previously fixed to the cable fixer 300 before the cable fixer 300 is mounted to the chassis 200 of the closure. Then as shown in FIG. 2, the cable fixer 300 previously fixed with the cables to be spliced 10, 20 is fixed to the chassis 200 of the closure.

Please continue to refer to FIGS. 5A and 5B, each of the cable fixers 300 comprises a strength member fixation unit for fixing the strength members 11, 21 of the cables to be spliced 10, 20.

In the exemplary embodiment shown in FIG. 5B and FIG. 5A, the strength member fixation unit comprises cylindrical projections 311, 312 and threaded fasteners 321, 322. The cylindrical projections 311, 312 project from surface of the cable fixer 300, threaded bores 3110, 3120 extending along axial direction of the cylindrical projections 311, 312 and strength member holes 301 and 302 (shown in dashed line in FIG. 5A) penetrating through the threaded bores 3110, 3120 along radial direction of the cylindrical projections 311, 312 are formed on the cylindrical projections 311, 312, the strength members 11, 21 of the cable 10, 20 penetrate through the strength member holes 301 and 302. The threaded fasteners 321, 322 are screwed into the threaded bores 3110, 3120 of the cylindrical projection 311, 312 for fixing the strength members 11, 21 penetrated through the strength member holes 301 and 302 to the cylindrical projections 311, 312.

In the exemplary embodiments shown in FIGS. 5A and 5B, each of the cable fixers 300 further includes fastening strips 361, 362. The fastening strips 361, 362 bound the outer sheath of the cable 10, 20 to ends of the cable fixer 300.

As shown in FIGS. 5A and 5B, each of the cable fixers 300 has an elongated body. Grooves for cable 341, 342 extending along the longitudinal direction of the elongated body are respectively formed in two ends of the elongated body. The outer sheaths of the cable 10, 20 are accommodated in the grooves for cable 341, 342.

Necks 351, 352 inwardly contracted along width direction of the elongated body are respectively formed at two ends of the elongated body. The fastening strips 361, 362 are positioned at the neck 351, 352, and bound the outer sheath of the cable 10, 20 to the neck 351, 352.

As shown in FIG. 5A, the surface of the grooves for cable 341, 342 is uneven surface so as to increase frictional holding force.

As shown in FIG. 5A and FIG. 5B, intermediate portion of the elongated body is a flat portion, and its height is lower than that of two ends of the elongated body, so that projected positioning edges 3411, 3421 are formed at two ends of the intermediate portion of the elongated body. The positioning edges 3411, 3421 are used for determining length of the outer sheath of the cable 10, 20 fixed on the cable fixer 300.

As shown in FIGS. 2, 4, 5A and 5B, the cable fixer 300 is mounted to the chassis 200 of the closure by screws 3311.

As shown in FIGS. 5A and 5B, a plurality of fixation holes 331 are formed on the intermediate portion of the elongate body, and as shown in FIG. 4, threaded bores 231 corresponding to a plurality of fixation holes 331 are formed on bottom surface of the chassis 200 of the closure respectively. As shown in FIG. 2, bolts 3311 pass through the fixation holes 331 of the elongate body and screw into the threaded bores 231 of the chassis 200 so as to fix the cable fixer 300 to the chassis 200 of the closure.

Figure 6A:
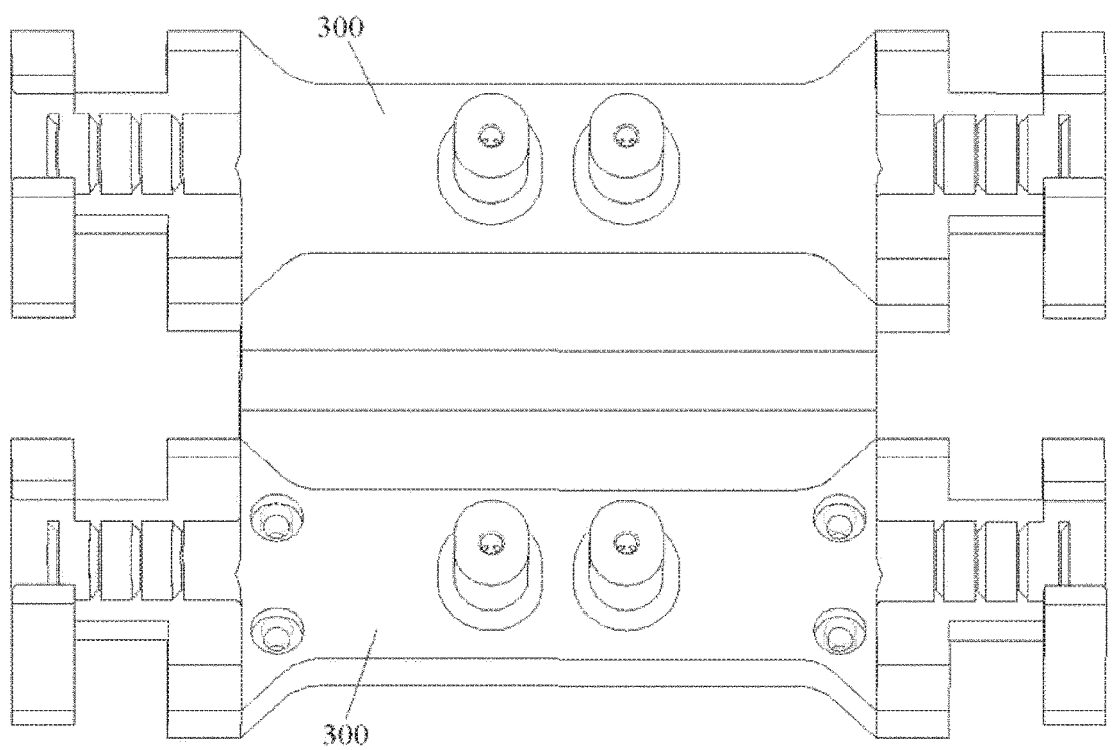
FIG. 6A shows a schematic diagram for simultaneously fixing a plurality of the cable fixer of a plurality of pairs of cables to be spliced.
Figure 6B:
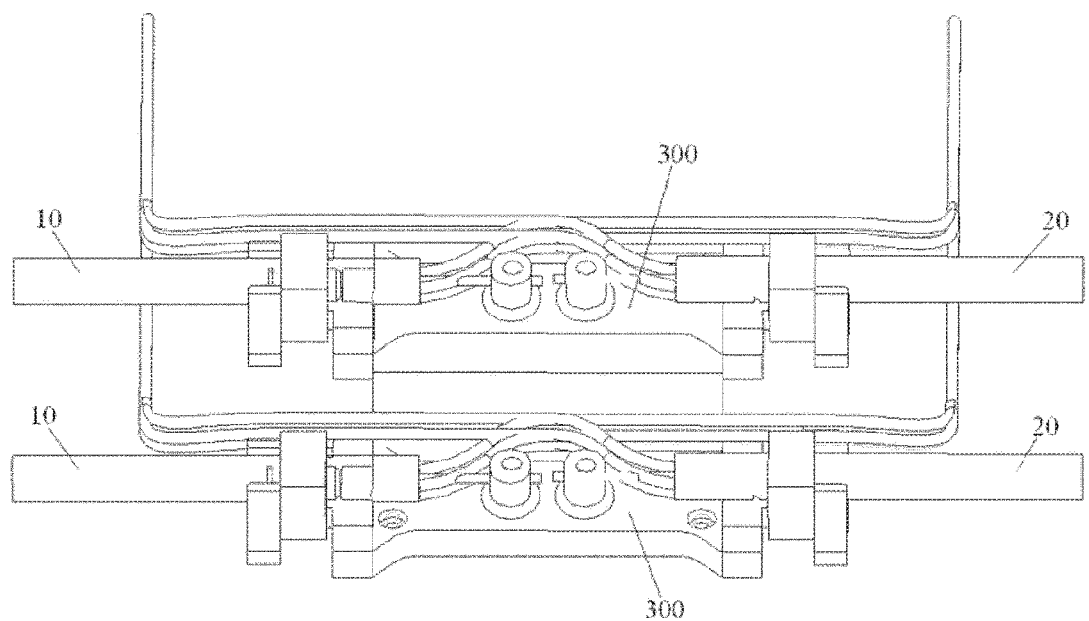
FIG. 6B shows a schematic view of previously fixing a strength member of the plurality of pairs of cables to be spliced and an outer sheath to the cable fixer.

FIG. 6A shows a schematic diagram for simultaneously fixing a plurality of the cable fixer 300 of a plurality of pair of cables to be spliced 10, 20; FIG. 6B shows a schematic view of previously fixing a strength member of the plurality of pairs of cable to be spliced 10, 20 and an outer sheath to the cable fixer 300.

In the embodiment shown in FIG. 6A and FIG. 6B, it comprises a plurality of cable fixers 300 as shown in FIGS. 5A and 5B for fixing the plurality of pairs of cables to be spliced 10, 20 to the chassis 200 of the closure.

Figure 7A:
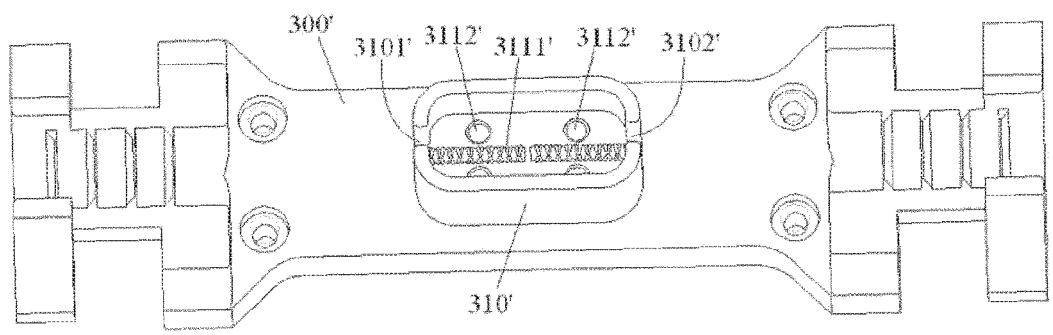
FIGS. 7A and 7B show schematic views of the cable fixer according to another exemplary embodiment of the present invention.
Figure 7B:
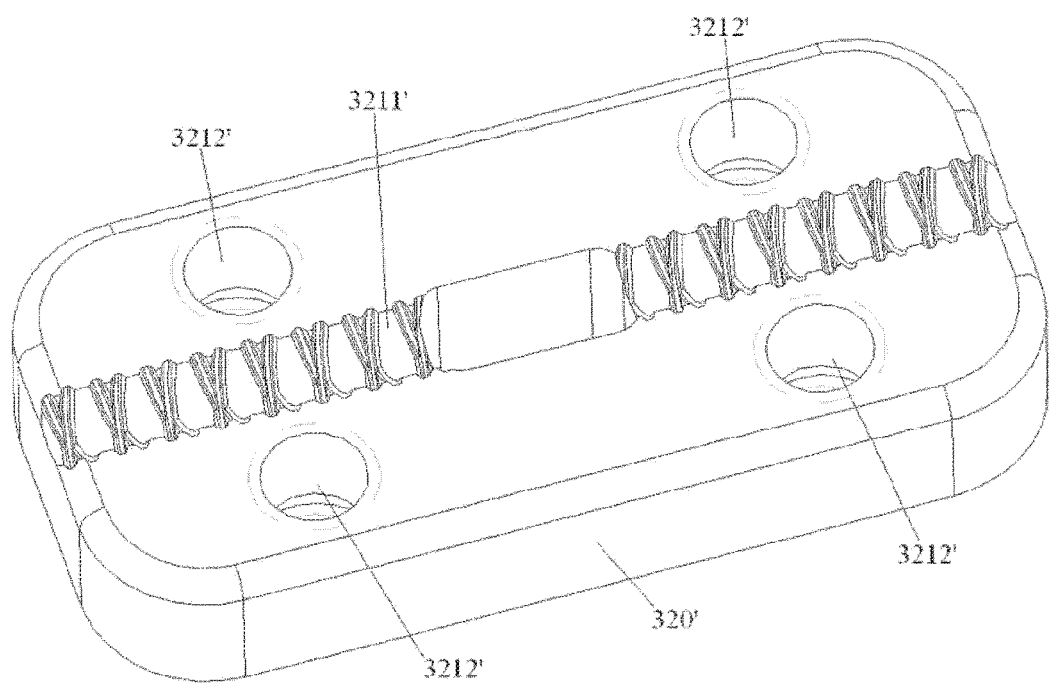
Figure 7C:
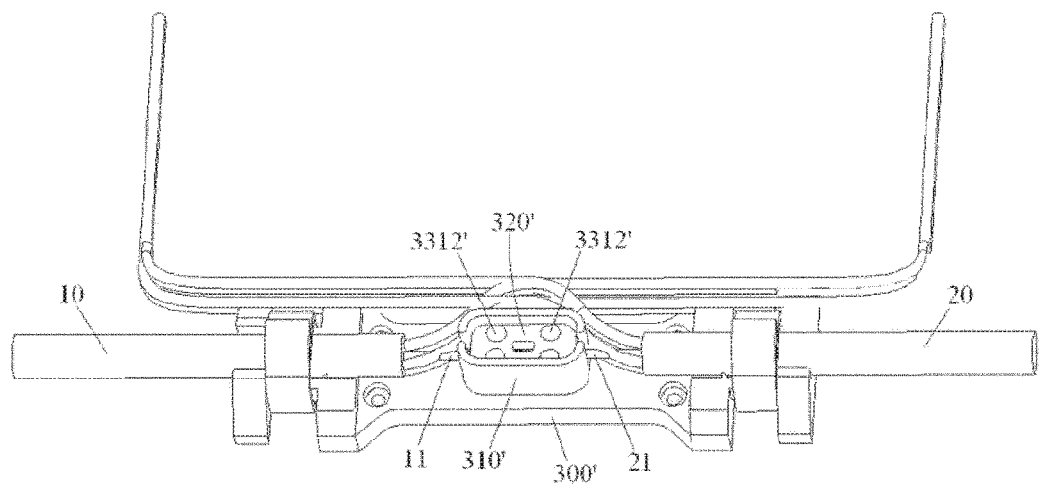
FIG. 7C shows a schematic view of fixing the strength member of the cable with the cable fixer in FIGS. 7A and 7B.

FIGS. 7A and 7B show schematic views of the cable fixer 300' according to another exemplary embodiment of the present invention; FIG. 7C shows a schematic view of fixing the strength members 11, 21 of the cables 10, 20 with the cable fixer 300' in FIGS. 7A and 7B;

In the embodiment shown in FIGS. 7A, 7B, and 7C, a strength member fixation unit comprises: a box-shaped accommodating portion 310' and a clamp 320'. The box-shaped accommodating portion 310' is formed on the surface of the cable fixer 300, the box-shaped accommodating portion 310' has four walls projecting from the surface of the cable fixer 300, and strength member holes 3101', 3102' are formed on the end wall of the box-shaped accommodating portion 310', a first groove for strength member 3111' is formed on the bottom surface of the box-shaped accommodating portion 310', the strength members 11, 21 of the cables 10, 20 penetrates through the strength member holes 3101', 3102' and is accommodated in the first groove for strength member 3111'. The clamp 320' is accommodated in the box-shaped accommodating portion 310' and is fastened to bottom of the box-shaped accommodating portion 310' by the screws 3312', so as to squeeze the strength members 11, 21 penetrated through the strength member holes 3101', 3102' of the box-shaped accommodating portion 310' into the first groove for strength member 3111'.

As shown in FIGS. 7A, 7B and 7C, the clamp 320' is an integral member for squeezing and fixing the cables to be spliced 10, 20 to the strength members 11, 21.

Please continue to refer to FIGS. 7A, 7B and 7C, threaded bores 3112' are formed on bottom surface of the box-shaped accommodating portion 310', and fixing holes 3212' are formed on the clamps 320', screws 3312' pass through the fixing hole 3212' of the clamps 320' and screw into the threaded bores 3112' of the box-shaped accommodating portion 310', so as to fasten the clamps 320' to bottom of the box-shaped accommodating portion 310'.

As shown in FIGS. 7A, 7B and 7C, a second groove for strength member 3211' is formed on the clamp 320'. The strength members 11, 21 are squeezed between the first groove for strength member 3111' and the second groove for strength member 3211'.

As shown in FIGS. 7A, 7B and 7C, surfaces of the first groove for strength member 3111' and/or the second groove for strength member 3211' are uneven surfaces so as to increase friction holding force for the strength members 11, 21.

Figure 8A:
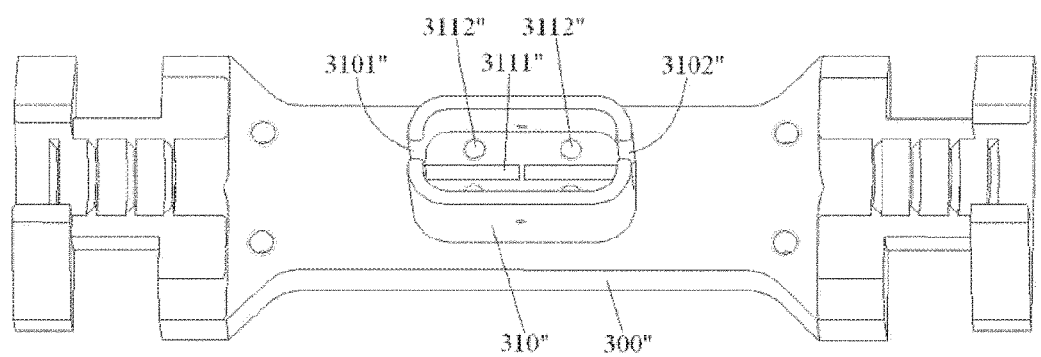
FIGS. 8A, 8B and 8C show schematic views of the cable fixer according to other exemplary embodiment of the present invention.
Figure 8B:
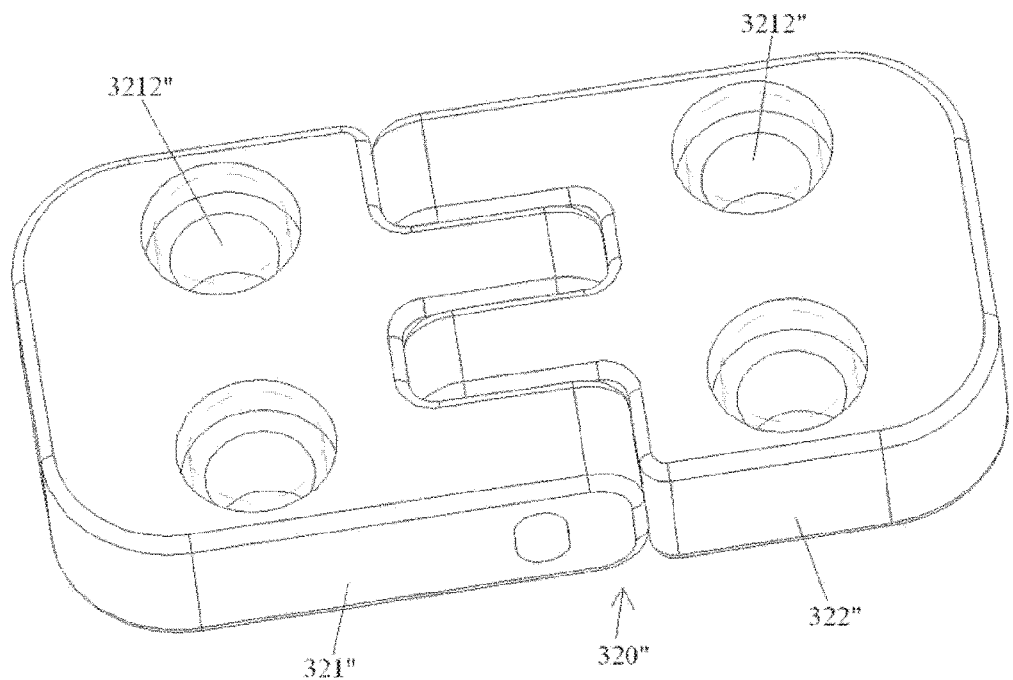
Figure 8C:
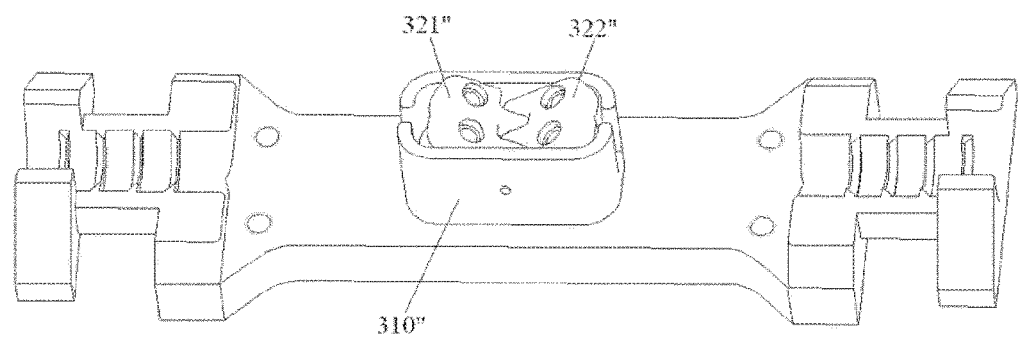
Figure 8D:
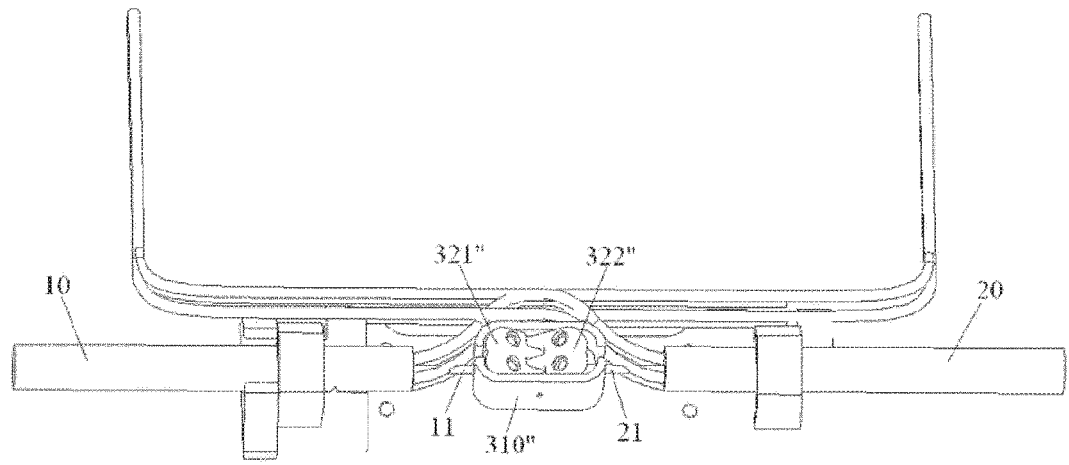
FIGS. 8D and 8E show schematic view of fixing the strength member of the cable with the cable fixer in FIGS. 8A, 8B and 8C.
Figure 8E:
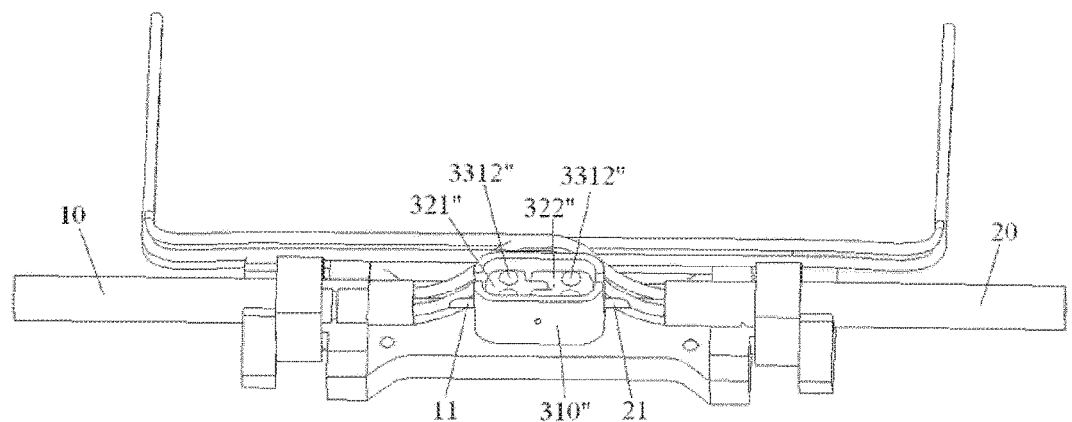

FIGS. 8A, 8B and 8C show schematic views of the cable fixer 300'' according to other exemplary embodiment of the present invention; FIGS. 8D and 8E show schematic view of fixing the strength member of the cable with the cable fixer 300'' in FIGS. 8A, 8B and 8C;

In the embodiment shown in FIGS. 8A, 8B, 8C, 8D and 8E, a strength member fixation unit 300'' comprises: a box-shaped accommodating portion 310'' and a clamp 320''. The box-shaped accommodating portion 310'' is formed on the surface of the cable fixer 300, the box-shaped accommodating portion 310'' has four walls projecting from the surface of the cable fixer 300'', and strength member holes 3101', 3102' are formed on the end wall of the box-shaped accommodating portion 310'', a first groove for strength member 3111'' is formed on the bottom surface of the box-shaped accommodating portion 310'', the strength members 11, 21 of the cables 10, 20 penetrates through the strength member holes 3101'', 3102'' and are accommodated in the first groove for strength member 3111''. The clamp 320'' is accommodated in the box-shaped accommodating portion 310'' and is fastened to bottom of the box-shaped accommodating portion 310'' by the screw 3312'', so as to squeeze the strength members 11, 21 penetrated through the strength member holes 3101'', 3102'' of the box-shaped accommodating portion 310'' into the first groove for strength member 3111''.

As shown in FIGS. 8A, 8B, 8C, 8D and 8E, the clamps 320'' includes a first block 321'' and a second block 322'', the first block 321'' and the second block 322'' are mutually pivotally connected together, and the first block 321'' is used to individually squeeze and fix the strength members 11 of the first cable 10 of the cables to be spliced 10, 20, the second block 322'' is used to individually squeeze and fix the strength members 21 of the second cable 20 of the cables to be spliced 10, 20, As shown in FIGS. 8A, 8B, 8C, 8D and 8E, threaded bores 3112'' are formed on bottom surface of the box-shaped accommodating portion 310'', and fixing holes 3212'' are formed on the clamps 320'', screws 3312'' pass through the fixing hole 3212'' of the clamps 320'' and are screwed into the threaded bores 3112'' of the box-shaped accommodating portion 310'', so as to fasten the clamps 320'' to bottom of the box-shaped accommodating portion 310''.

Although not shown, a second groove for strength member 3211'' is also formed on the clamps 320'. The strength members 11, 21 are squeezed between the first groove for strength member 3111'' and the second groove for strength member 3211''.

In one embodiment of the present invention, the surfaces of the first groove for strength member 3111'' and/or the second groove for strength member 3211'' are uneven surfaces so as to increase friction holding force for the strength members 11, 21.

According to another general concept of the present invention, there is provided a fiber optic splice protection device, comprising: a closure including a cover 100 and a chassis 200; and a fiber routing management unit 400, mounted on the chassis 200 of the closure, wherein the fiber routing management unit 400 comprises: a bottom sheet

401; flexible clippers 410, 420, which are removably mounted on top of the bottom sheet 401; and a resilient biasing member 403, mounted on the chassis 200 of the closure, for applying elastic biasing force to the bottom sheet 401, wherein the bottom sheet 401 is pressed against the cable jackets 13, 23 of the cables to be spliced 10, 20 under the action of the elastic biasing member 403 for preventing from winding and messy of the cable jackets 13, 23; and wherein fiber optics 12, 22 of the cables to be spliced 10, 20 wind above the bottom sheet 401 and along a no bending loss path defined by the flexible clippers 410, 420, and are restrained to an appropriate location in order by the flexible clippers 410, 420.

Figure 9A:
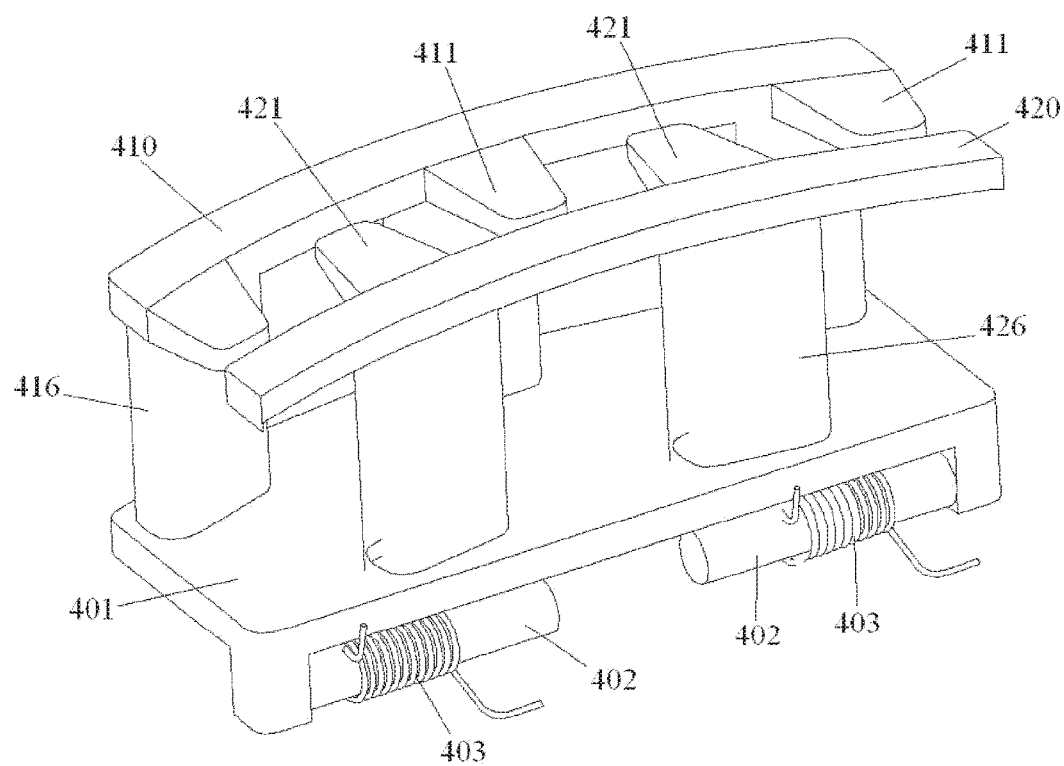
FIG. 9A shows a schematic diagram of the fiber routing management unit according to one exemplary embodiment of the present invention.

FIG. 2 shows a schematic diagram of a chassis 200 of the fiber optic splice protection device in FIG. 1 and a cable fixer 300 and a fiber routing management unit 400 mounted on the chassis 200; FIG. 9A shows a schematic diagram of the fiber routing management unit 400 according to one exemplary embodiment of the present invention.

As shown in FIG. 9A, in the illustrated embodiment, a fiber routing management unit 400 mainly comprises: a bottom sheet 401; flexible clippers 410, 420, which are removably mounted on top of the bottom sheet 401; and a resilient biasing member 403, mounted on the chassis 200 of the closure, for applying elastic biasing force to the bottom sheet 401, wherein the bottom sheet 401 is pressed against the cable jackets 13, 23 of the cables to be spliced 10, 20 under the action of the elastic biasing member 403 for preventing from winding and messy of the cable jackets 13, 23; and wherein fiber optics 12, 22 of the cables to be spliced 10, 20 wind above the bottom sheet 401 and along a no bending loss path defined by the flexible clippers 410, 420, and are restrained to an appropriate location in order by the flexible clippers 410, 420.

The present invention utilizes the bottom sheet 401 to separate the cable jackets 13, 23 from the fiber optics 12, 22, not only to orderly manage the cable jackets 13, 23 from the fiber optics 12, 22, but also to expand winding space of the fiber optics 12, 22, because the fiber optic 12, 22 may be coiled directly above the bottom sheet 401.

Please continue to refer to FIG. 9A, the elastic biasing member 403 is torque spring, a pair of mutually facing mounting shafts 402 are formed on one side of the bottom of the bottom sheet 401, and a pair of torque spring are respectively sets on a pair of mounting shafts 402.

Figure 10A:
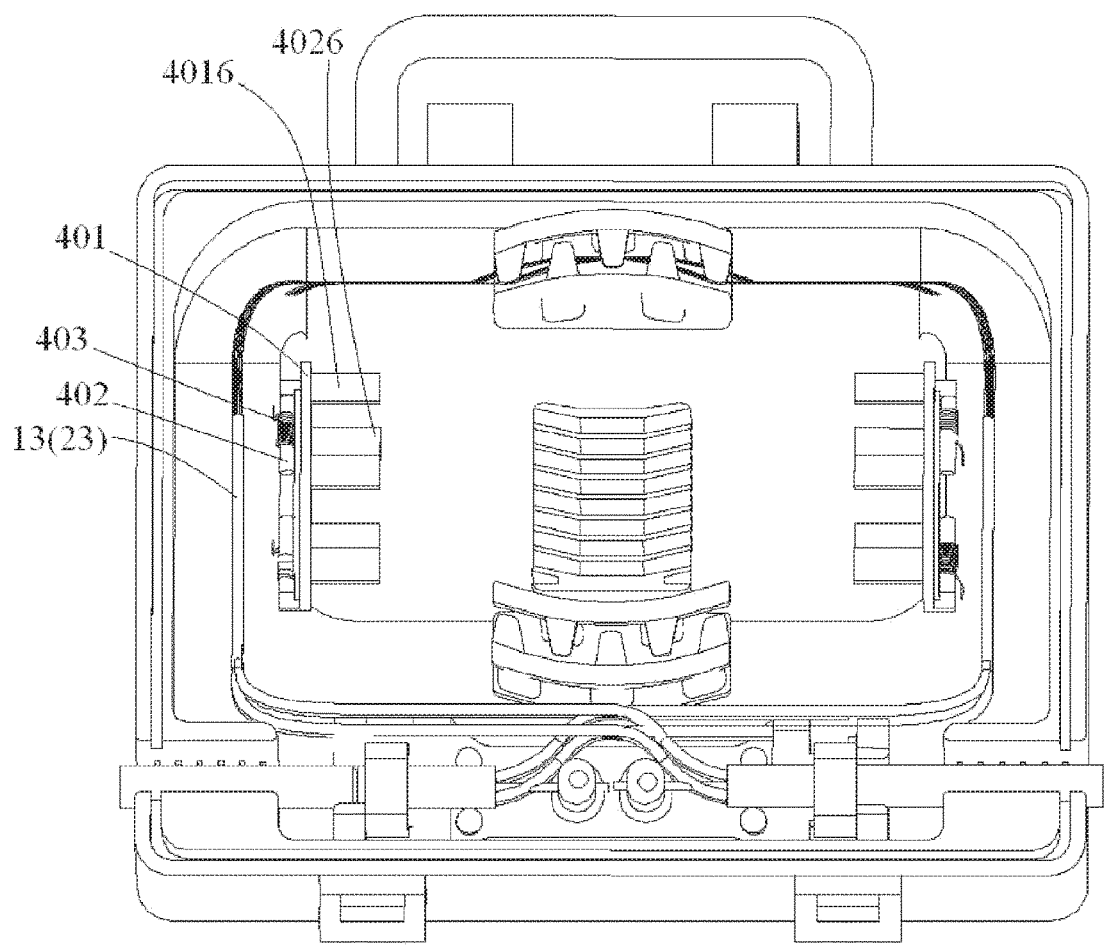
FIG. 10A shows a schematic diagram of positioning the fiber routing management unit in FIG. 9A on the chassis.
Figure 10B:
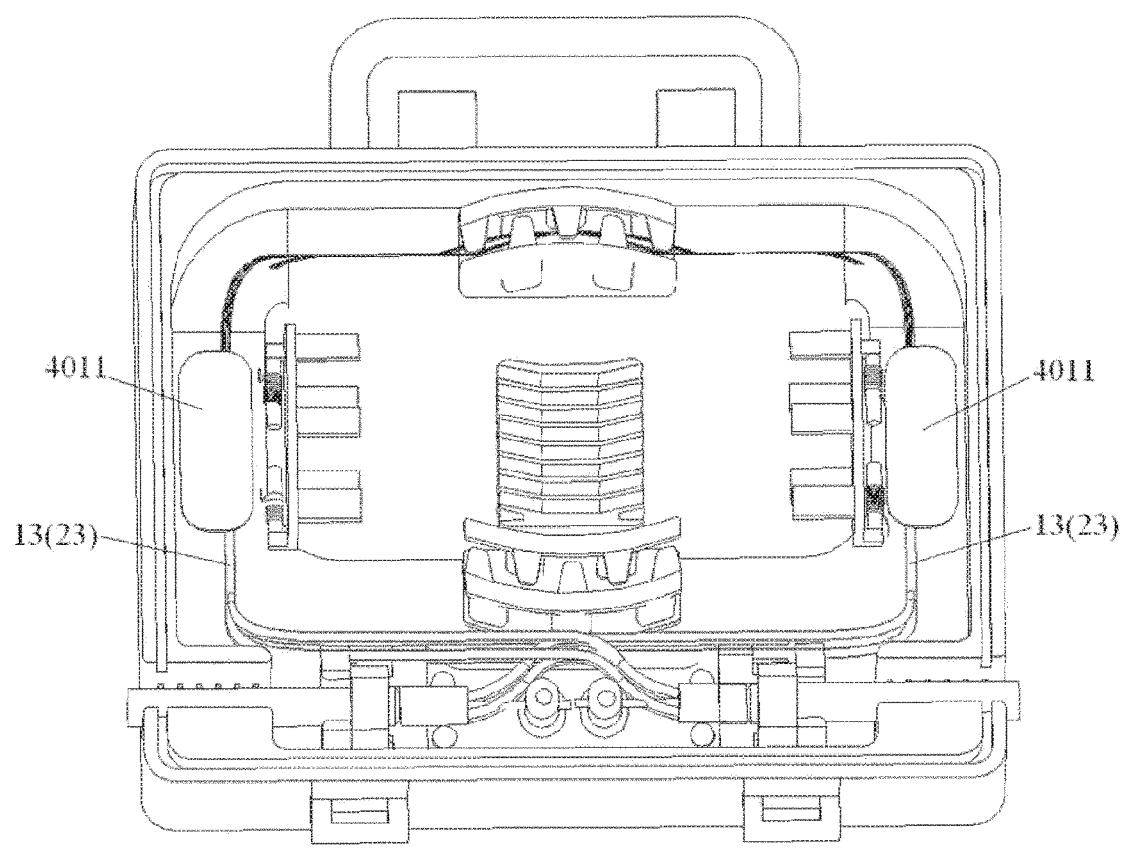
FIG. 10B shows a schematic diagram of the fiber routing management unit with a separate flexible pad according to other exemplary embodiment of the present invention.

As shown in FIG. 10A, a slot for cable jacket is formed on bottom surface of the chassis 200 of the closure; cable jackets 13, 23 are placed in the slot and are pressed below the bottom sheet 401. In one embodiment of the present invention, the bottom sheet 401 may be a flexible sheet-like member. However, the present invention is not limited to this, the bottom sheet 401 may be a rigid sheet-like member, when the bottom sheet 401 is a rigid sheet-like member, a flexible spacer may be provided under the bottom sheet 401, for example, as shown in FIG. 10B, the fiber routing management unit further includes a flexible spacer 4011, the flexible spacer 4011 covers on the cable jackets 13, 23, and the bottom sheet 401 is pressed on the flexible spacer 4011.

As shown in FIGS. 9A and 10A, a plurality of protruded connector sheet 4016, 4026 are formed on upper surface of the bottom sheet 401. Flexible clippers 416, 426 comprise legs 416, 426 and a plurality of teeth-like portion 411, 421 located at upper end of the leg portion. Insertion holes (not shown) are formed in lower end of the legs 416, 426, the connector sheet 4016, 4026 are inserted into inserting holes, so that the flexible clippers 410, 420 are assembled to the bottom sheet 401.

Figure 9B:
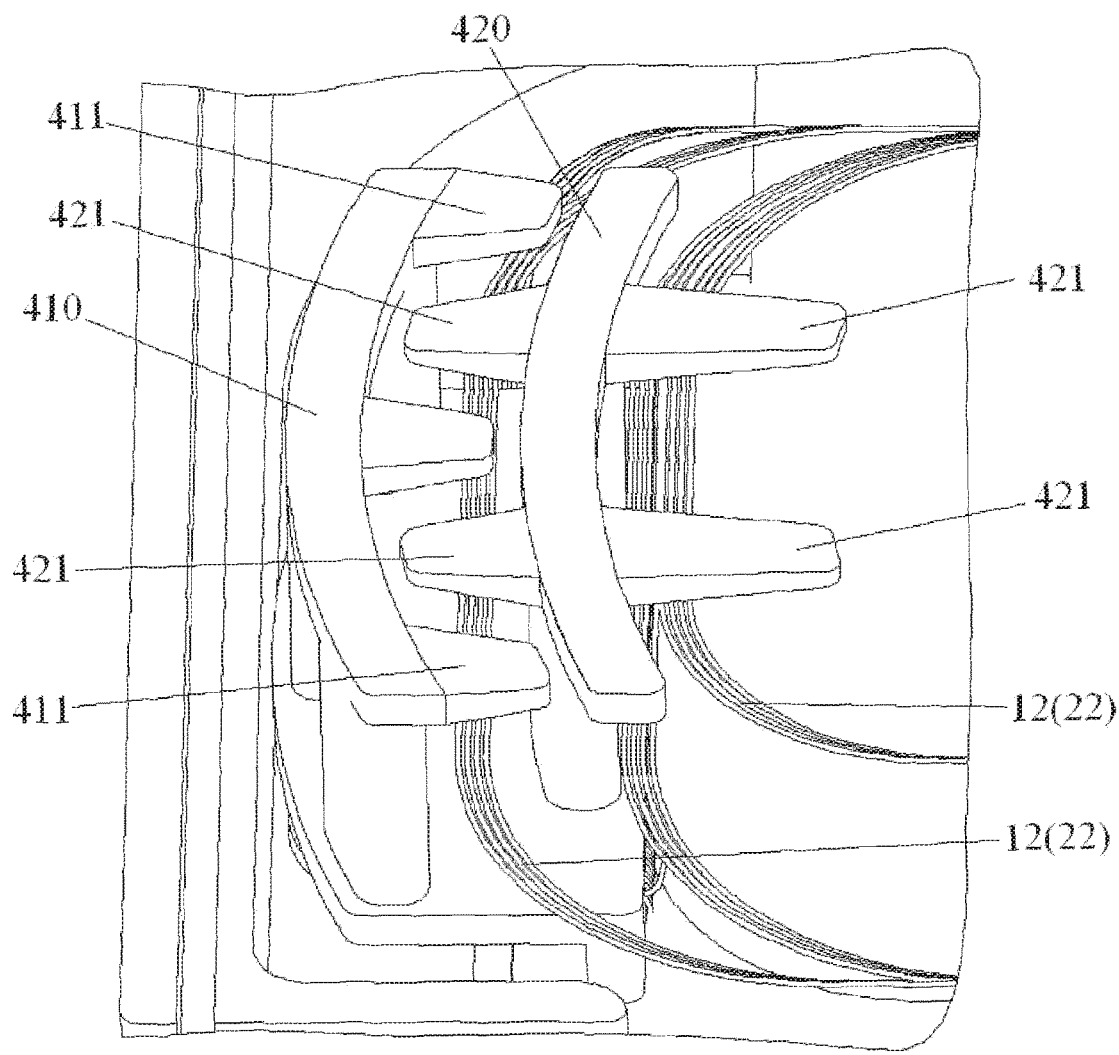
FIG. 9B shows a schematic diagram of the fiber routing management unit according to another exemplary embodiment of the present invention.
Figure 9C:
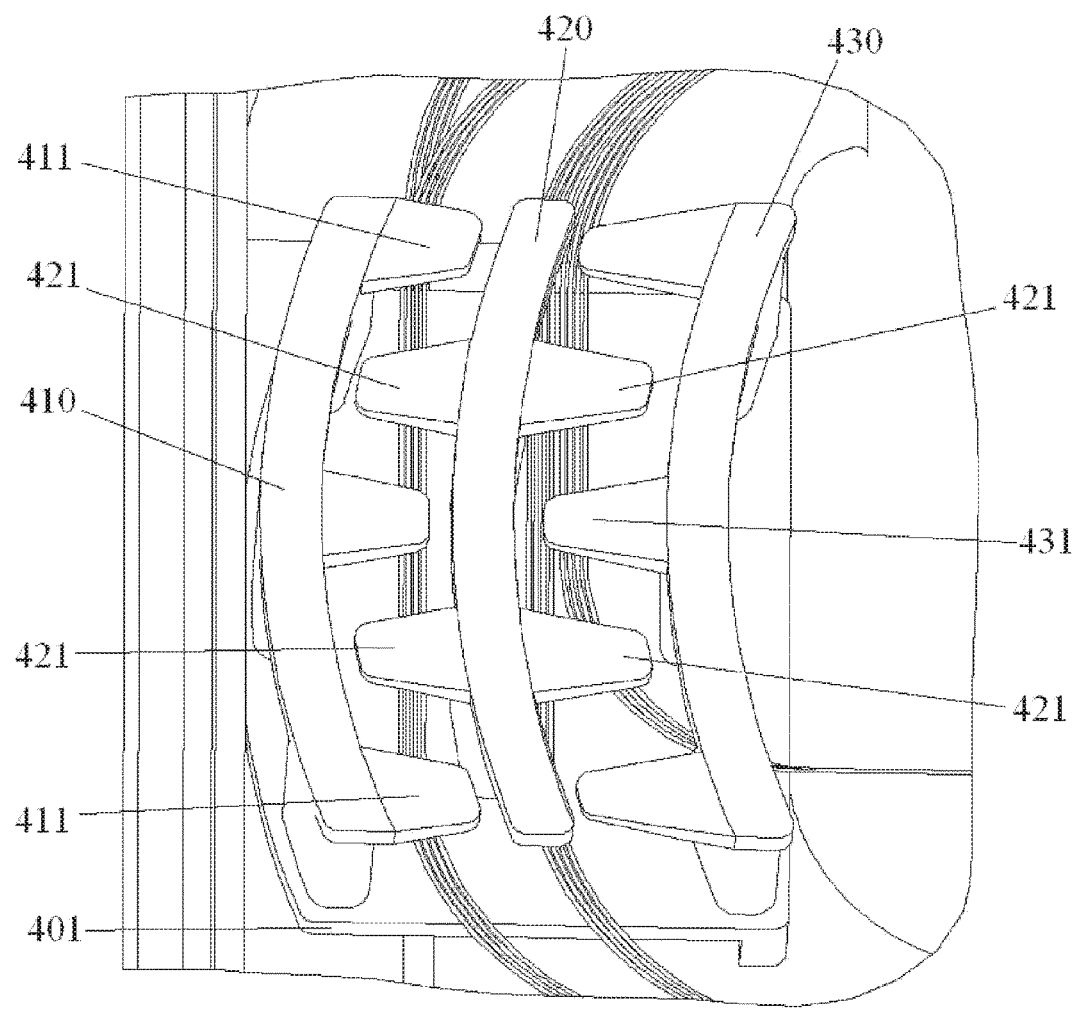
FIG. 9C shows a schematic diagram of the fiber routing management unit according to other exemplary embodiment of the present invention.

As shown in FIGS. 9A, 9B and 9C, a plurality of flexible clippers 410, 420 are provided at each of the bottom sheets 401, and teeth-like portions 411, 421 of adjacent two flexible clippers 410, 420 are alternately arranged.

As shown in FIGS. 9A and 9B, a first flexible clipper 410 and second flexible clippers 420 are mounted at each of the bottom sheets 401, and a first flexible clipper 410 and second flexible clippers 420 are spaced and faced with each other.

As shown in FIG. 2 and FIG. 9A, the first flexible clipper 410 is provided at outer side of the chassis 200 near the closure, and the second flexible clipper 420 is disposed at inner side of the first flexible clippers 410.

In the embodiment shown in FIG. 9A, a plurality of first teeth-like portions 411 are only formed at one side of the first flexible clipper 410 facing the second flexible clippers 420; and a plurality of second teeth-like portions 421 are only formed at one side of the second flexible clipper 420 facing the first flexible clippers 410.

In the embodiment shown in FIG. 9B, a plurality of first teeth-like portions 411 are only formed at one side of the first flexible clipper 410 facing the second flexible clippers 420; and a plurality of second teeth-like portions 421 are formed both at one side of the second flexible clipper 420 facing the first flexible clippers 410 and another side facing away from the first flexible clippers 410. Thus, coiled fiber 12, 22 can be wound not only between the first flexible clipper 410 and second flexible clippers 420, but also the side of the second flexible clippers 420 facing away from the first flexible clipper 410, so as to increases coiled space of the fiber optic 12 and 22.

In the embodiment shown in FIG. 9C, a third flexible clipper 430 is equipped on each of the bottom sheet 401, the third flexible clipper 430 is arranged inside of the second flexible clipper 420, and a plurality of third teeth-like portions 431 are only formed on one side of the third flexible clipper 430 facing the second flexible clippers 420.

As shown in FIGS. 2, 10A and 10B, two pairs of fiber routing management units 400 are mounted in the chassis 200 of the closure, in which one pair of fiber routing management units 400 are arranged in the middle of the longitudinal two ends of the chassis 200, and the other pair fiber routing management unit 400 are arranged in the middle of the transverse two ends of the chassis 200.

As shown in FIGS. 2, 10A and 10B, a row of holder 250 are formed in the middle of the chassis 200 of the closure for holding fiber optic splice protection jacket (not shown, can be heat-shrinkable tube).

According to another general concept of the present invention, there is provided a fiber optic splice protection device comprising: a closure including a cover 100 and a chassis 200. Wherein a circle of groove 201 is formed on mating edge of four walls of one of the cover 100 and the chassis 200; a circle of projection 102 is formed on mating edge of four walls of another of the cover 100 and the chassis 200; the cover 100 is locked on the chassis 200 in the way of locking, when the cover is locked on the chassis 200, the projection 102 is pressed against the resilient seal 202 and is embedded into the groove 201 in order to achieve the seal locking between the cover 100 and the chassis 200.

Figure 3:
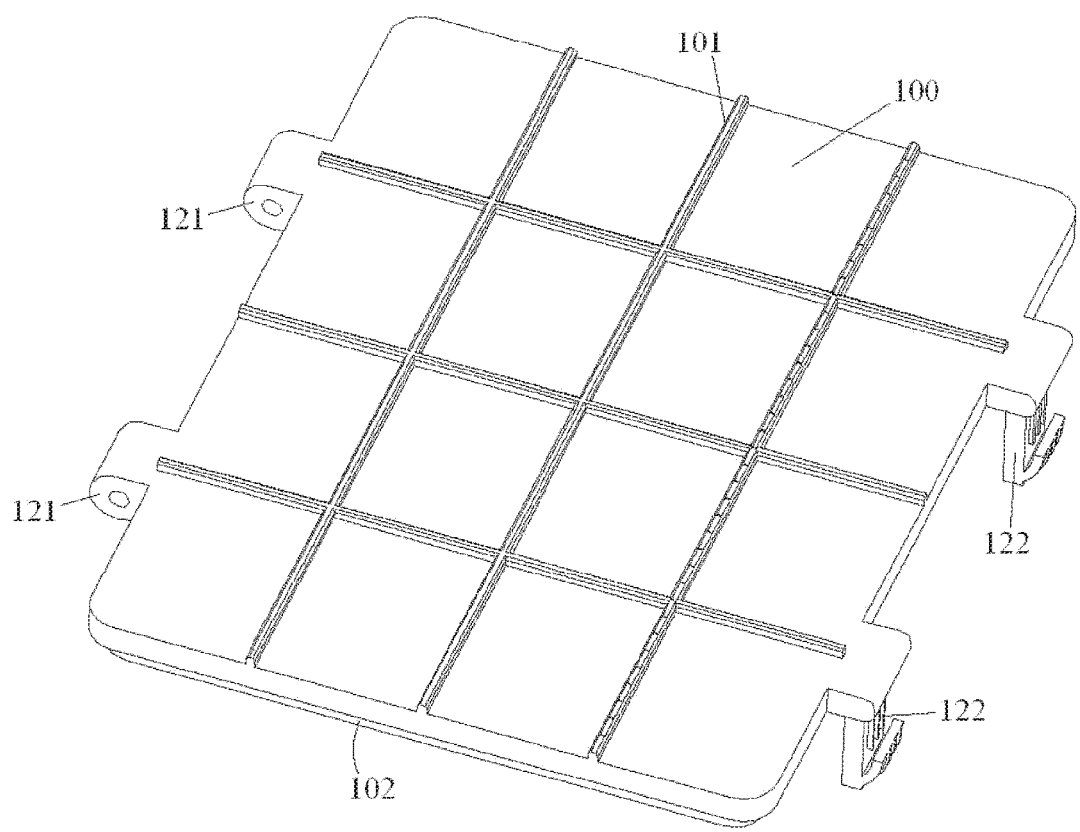
FIG. 3 shows a schematic perspective view of a cover of the fiber optic splice protection device.
Figure 11:
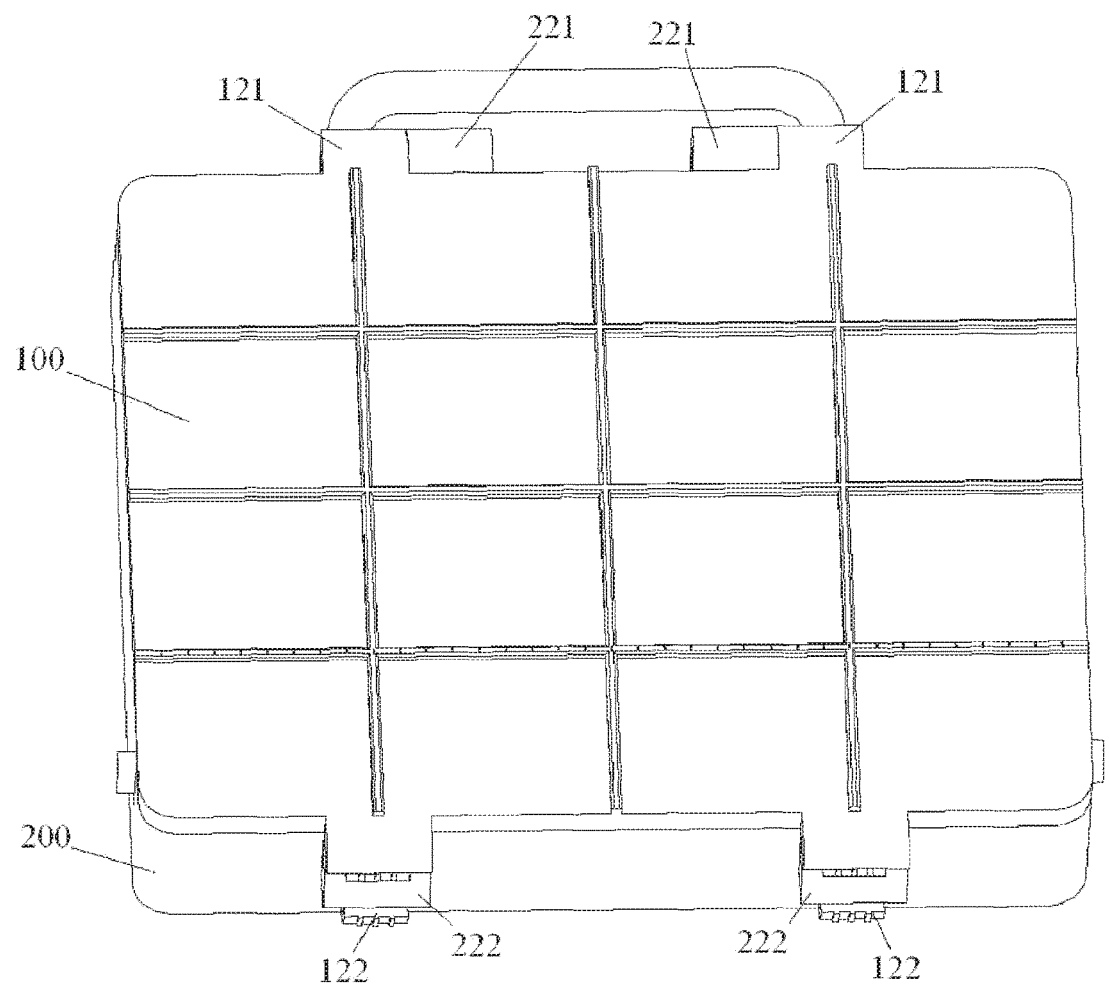
FIG. 11 shows a schematic diagram of the cover and the chassis of the fiber optic splice protection device in FIG. 1 closed together.

FIG. 3 shows a schematic perspective view of the cover 100 of a fiber optic splice protection device shown in FIG. 1. FIG. 11 shows a schematic view of the cover and the chassis closed together of a fiber optic splice protection device shown in FIG. 1.

As shown in FIGS. 1, 3 and 4, a circle of groove 201 is formed on upper mating edge of four walls of the chassis 200, and an elastic sealing member 202 is placed in the groove 201. A circle of projections 102 is formed on lower mating edge of four walls of the cover 100. The cover 100 is locked in the chassis 200 in locking manner, as shown in FIG. 11, when the cover is locked on the chassis 200, the projections 102 on the cover 100 is pressed on the elastic sealing member 202 and is embedded in the groove 201 in order to achieve seal locking between the cover 100 and the chassis 200.

However, the present invention is not limited to the illustrated embodiment, in another embodiment of the present invention, a circle of projections is formed on upper mating edge of four walls of the chassis, and a circle of groove is formed on lower mating edge of four walls of the cover.

In an exemplary embodiment of the present invention, at least one side of the cover 100 and the chassis 200 are locked to each other by a locking device.

Please continue to refer to FIG. 1, FIG. 3, FIG. 4 and FIG. 11, in the illustrated embodiment, one side of the cover 100 and the chassis 200 pivotally connected together by a hinge, and the other side of the cover 100 and the chassis 200 are mutually locked together through locking device.

As shown in FIGS. 1, 3, 4 and 11, the locking means is a snap structure, and the snap structure comprising: a resilient hooks 122 formed on the cover 100; and a notch 222 formed in the chassis, wherein when the elastic hook 122 is inserted and snapped into the notch 222, the cover 100 and chassis 200 are locked together.

Figure 12:
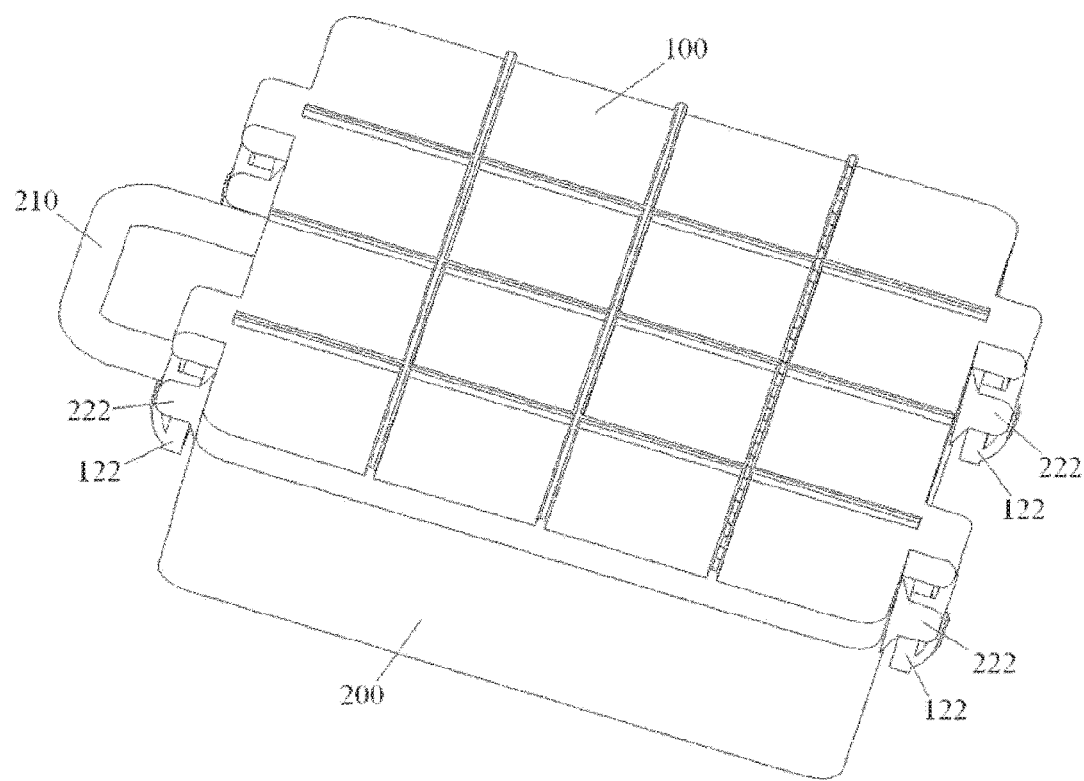
FIG. 12 shows a schematic diagram of a locking structure of the cover and the chassis of the fiber optic splice protection device according to another exemplary embodiment of the present invention.
Figure 13A:
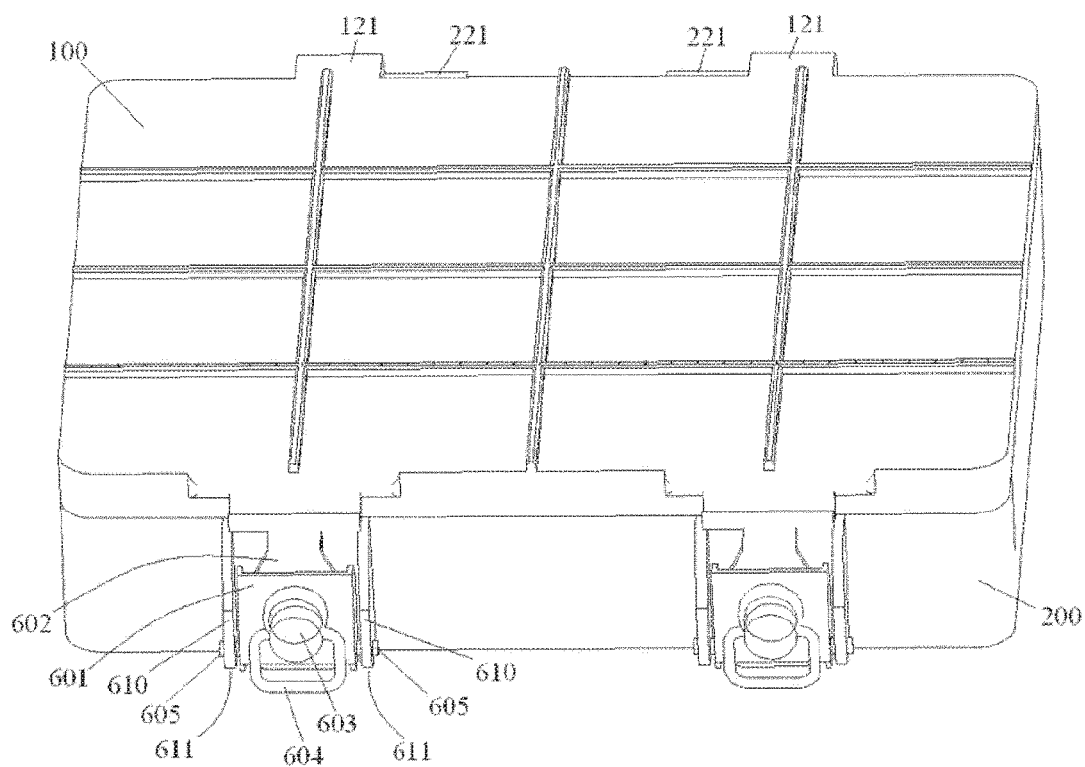
FIG. 13A shows a schematic diagram of a locking structure of the cover and the chassis of the fiber optic splice protection device according to other exemplary embodiment of the present invention, wherein the cover and the chassis are in a locked position.
Figure 13B:
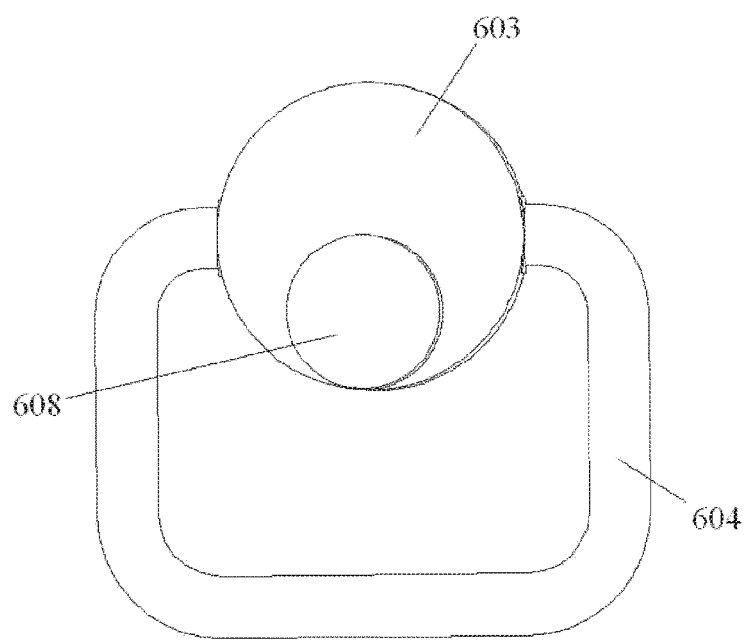
FIG. 13B shows position of the eccentric cam member when the cover and the chassis in the locked position.
Figure 13C:
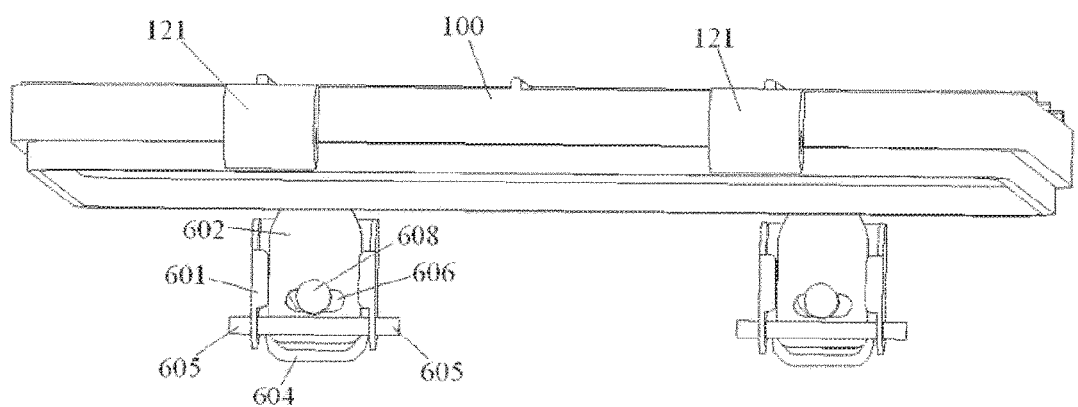
FIG. 13C shows an inner side view of an eccentric wheel locking mechanism when the cover and the chassis in the locked position.
Figure 14A:
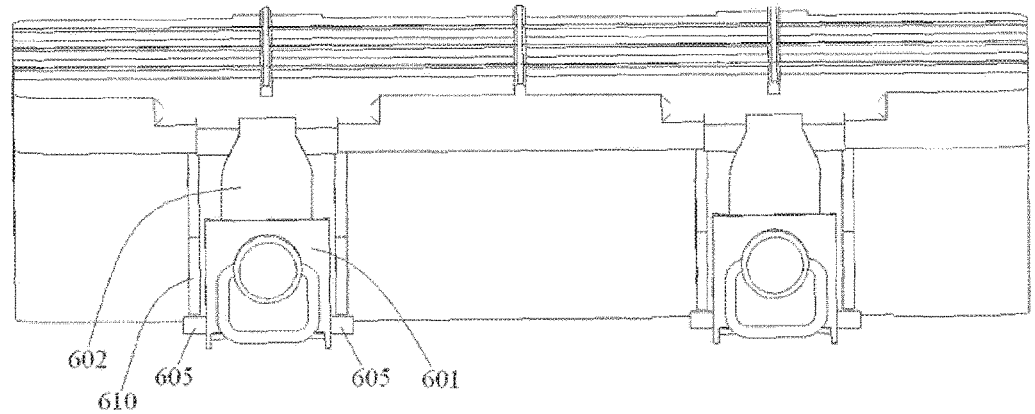
FIG. 14A shows a schematic diagram of a locking structure of the cover and the chassis of the fiber optic splice protection device according to other exemplary embodiment of the present invention, wherein the cover and the chassis are in an unlocked position.
Figure 14B:
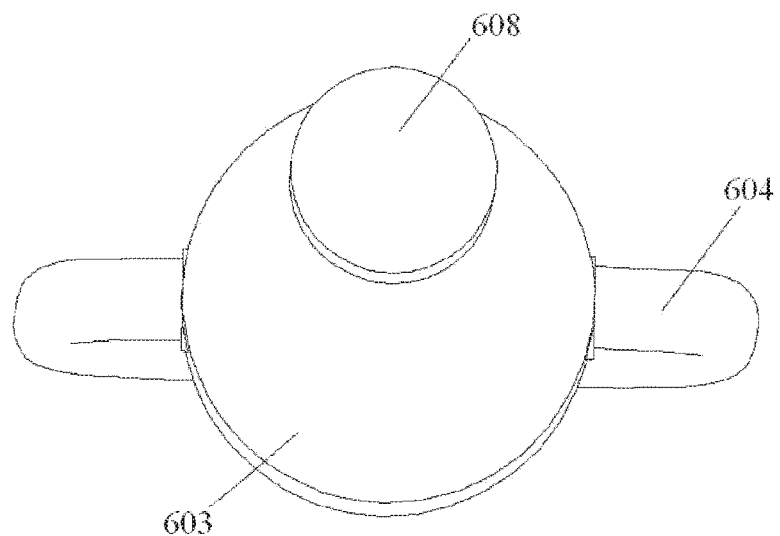
FIG. 14B shows position of the eccentric cam member when the cover and the chassis in the unlocked position.
Figure 14C:
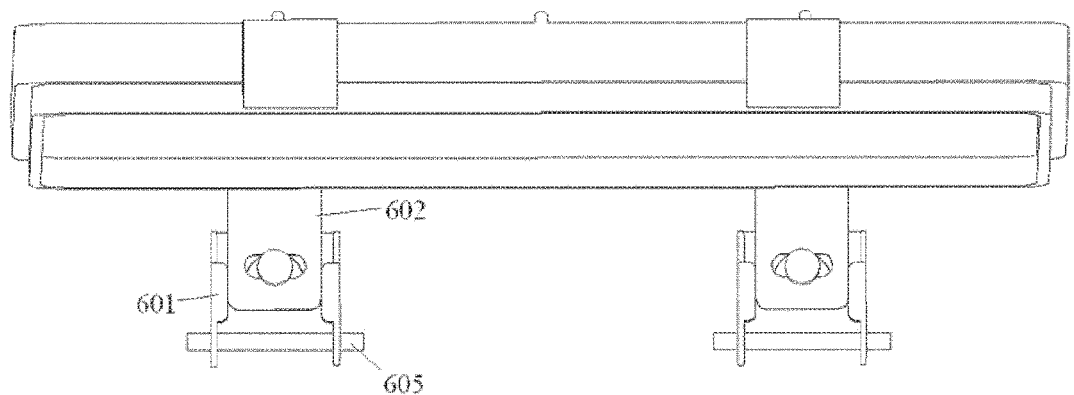
FIG. 14C shows an inner side view of an eccentric wheel locking mechanism when the cover and the chassis in the unlocked position.

FIG. 12 shows a schematic view of the locking structure of the cover and the chassis of the fiber optic splice protection device according to another exemplary embodiment of the present invention.

As shown in FIG. 12, one side of the cover 100 and the chassis 200 is locked to each other by a locking means, and the other side of the cover 100 and chassis 200 are also locked to each other by a locking means.

FIGS. 13A, 13B, 13C, FIGS. 14A, 14B and 14C show schematic diagrams of a locking structure of the cover and the chassis of the fiber optic splice protection device according to other exemplary embodiment of the present invention.

As shown in FIG. 13A, FIG. 13B, FIG. 13C, FIGS. 14A, 14B and 14C, the locking means is a cam locking mechanism, the eccentric wheel locking mechanism comprises: a snapping plate 602, connected to the cover 100; a sliding plate 601 slidably mounted on the snapping plate 602 and can slide along the snapping plate 602; a rotating circular plate 603 rotatably mounted on the sliding plate 601; an eccentric cam member 608, connected to the rotating circular plate 603 and offset from the center of the rotating circular plate 603 by a predetermined distance, and the eccentric cam member 608 is joined to the notch 606 formed on the snapping plate 602; shaft member 605 connected to the lower end of the sliding plate 601; and a slot 611 formed on the chassis 200, the shaft member 605 is retained to the slot 611, wherein the eccentric cam member 608 can move between a locked position (the position shown in FIGS. 13A, 13B and 13C) locking the cover 100 and the chassis 200, and an unlocked position (the position shown in FIG. 14A, FIG. 14B and FIG. 14C) releasing the cover 100 and chassis 200, when the rotating circular plate 603 is rotated; and wherein, when the eccentric cam member 608 moves toward the locked position, the eccentric cam member 608 drives the sliding plate 601 and the snapping plate 602 to moves in a direction for closing to each other, so as to apply tension force to the cover 100 and the chassis 200 for achieving the locking between the cover 100 and the chassis 200; and wherein the eccentric cam member 608 drives the sliding plate 601 and the snapping plate 602 to moves toward a direction for separating from each other so as to release the cover 100 and chassis 200 when the eccentric cam member 608 is moving toward the unlocked position.

As shown in FIG. 13A, FIG. 13B, FIG. 13C, FIG. 14A, FIG. 14B and FIG. 14C, the rotating circular plate 603 is connected to a rotating wrench 604, for applying a rotational force to the rotating circular plate 603.

As shown in FIG. 13A, FIG. 13B, FIG. 13C, FIGS. 14A, 14B and 14C, a pair of rib projections 610 are formed on side of the chassis 200, and the sliding plate 601 and the snapping plate 602 of each cam locking mechanism are located between corresponding pair of projecting ribs 610.

As shown in FIG. 13A, FIG. 13B, FIG. 13C, FIGS. 14A, 14B and 14C, the slot 611 is formed on the lower end of each pair of projecting ribs 610, two ends of the shaft member 611 are locked into the slot 611.

Figure 15:
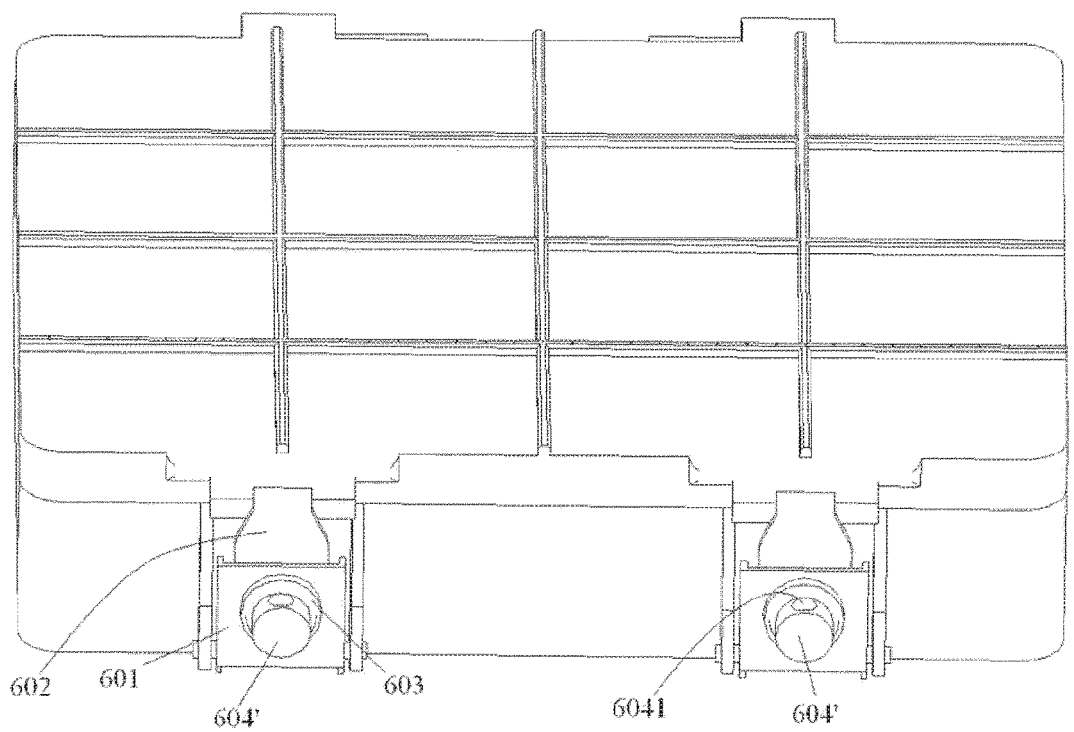
FIG. 15 shows a schematic diagram of a locking structure of the cover and the chassis of the fiber optic splice protection device according to other exemplary embodiment of the present invention.

FIG. 15 shows a schematic diagram of a locking structure of the cover and the chassis of the fiber optic splice protection device according to other exemplary embodiment of the present invention;

As shown in FIG. 15, an insertion hole 6041 is formed on rotating circular plate 603, for inserting force arm tool into the insertion hole 6041 so as to impart rotational force to the rotating circular plate 603.

In the embodiment shown in FIG. 13A, FIG. 13B, FIG. 13C, FIGS. 14A, 14B and 14C, the eccentric cam member 608 has disk-shape and has a diameter smaller than that of the rotating circular plate 603.

Figure 16:
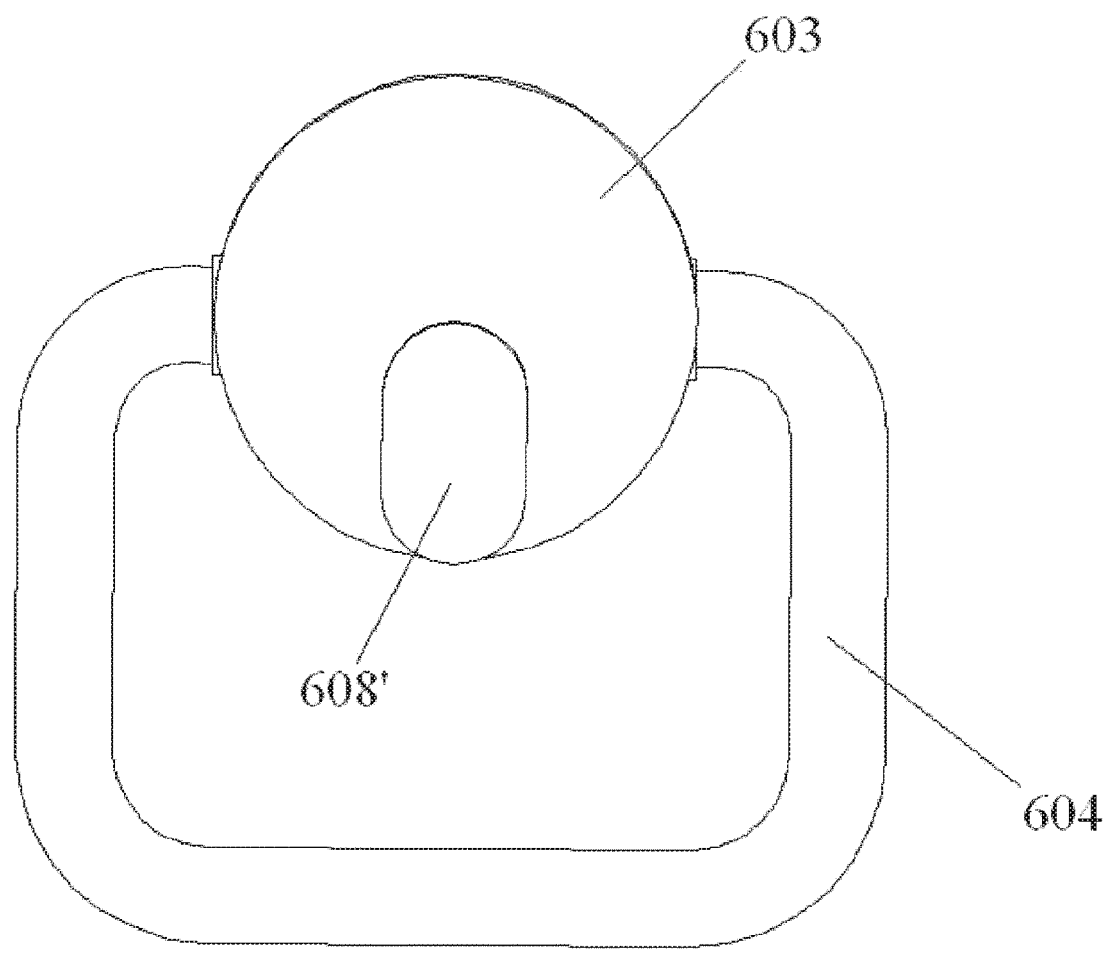
FIG. 16 shows a schematic diagram of the eccentric cam member according to other exemplary embodiment of the present invention.

FIG. 16 shows a schematic diagram of the eccentric cam member according to other exemplary embodiment of the present invention.

In the embodiment shown in FIG. 16, the eccentric cam member 608 has oval-shape, and its major-axis length is less than the diameter of the rotating circular plate 603.

Referring to FIG. 4 and FIG. 2, grooves for cable 211, 212 are formed on the side wall of the chassis 200, the cables to be spliced 10, 20 are accommodated in the cable receiving slots 211, 212.

As shown in FIG. 1, the outer side wall of the chassis 200 is formed with a holder knob 210.

As shown in FIG. 3, a number of mutually crossing longitudinal and transverse strength members 101 are formed on the outer surface of the cover 100.

As shown in FIG. 3, a ruler is on the strength member, to provide on-site installation measurement function, for easy on-site installation without need to carry a separate length measuring tools. Those skilled in the art will appreciate, the above-described embodiments are exemplary, and those skilled in the art can improve it, and the structure described in various embodiments can be freely combined without structure or principle conflict occurred.

Although the drawings of the present invention has been described, but embodiments disclosed in the figures are intended to be illustrative description of the preferred embodiments of the present invention, and not be construed as a limitation of the present invention.

Although several embodiments of the present general inventive concept have been shown and described, those skilled in the art will appreciate, these embodiments of the present invention may be changed without departing from the principles and spirit of the general inventive concept of the case, the scope of the present invention is defined by claims and their equivalents.

It should be noted that the wording "comprising" does not exclude other elements or steps, the phrase "a" or "an" does not exclude plurality. Further, any references in claims should not be construed as limiting the scope of the invention.

What is claimed is:

1. A fiber optic splice protection device, comprising:
   a closure including a cover and a chassis; and
   at least one cable fixer for fixing cables to be spliced to the chassis of the closure,
   cylindrical projections projecting from surface of the cable fixer, on which are formed threaded bores extending along axial direction of the cylindrical projections and strength member holes penetrating through the threaded bores along radial direction of the cylindrical projections, the strength members of the cable penetrate through the strength member holes; and
   threaded fasteners screwed into the threaded bores of the cylindrical projection for fixing the strength members penetrated through the strength member holes to the cylindrical projections;
   wherein:
   the cable fixer is a separate member separated from the chassis, and is removably mounted in the chassis of the closure; and
   the device is configured such that all strength members of the cables to be spliced can be fixed to the cable fixer before the cable fixer is mounted to the chassis of the closure.

2. The fiber optic splice protection device of claim 1, wherein each of the cable fixers further includes:
   fastening strips, for bounding the outer sheath of the cable to ends of the cable fixer.

3. The fiber optic splice protection device of claim 2, wherein:
   each of the cable fixers has an elongated body, on two ends of which are formed grooves for cable extending along the longitudinal direction of the elongated body respectively, and the outer sheaths of the cable are accommodated in the grooves for cable; and
   necks inwardly contracted along width direction of the elongated body are respectively formed at two ends of the elongated body, the fastening strips are positioned at the neck, and bound the outer sheath of the cable to the neck.

4. The fiber optic splice protection device of claim 3, wherein:
   the surface of the grooves for cable is uneven surface so as to increase frictional holding force.

5. The fiber optic splice protection device of claim 4, wherein:
   intermediate portion of the elongated body is a flat portion, and its height is lower than that of two ends of the elongated body, so that projected positioning edges are formed at two ends of the intermediate portion of the elongated body, the positioning edges are used for determining length of the outer sheath of the cable fixed on the cable fixer.

6. The fiber optic splice protection device of claim 5, wherein:
   the pair of cylindrical projections are formed on the intermediate portion of the elongated body.

7. The fiber optic splice protection device of claim 5, wherein:
   the cable fixer is mounted to the chassis of the closure by screws.

8. The fiber optic splice protection device of claim 7, wherein:
   a plurality of fixation holes are formed on the intermediate portion of the elongate body, and threaded bores corresponding to a plurality of fixation holes are formed on bottom surface of the chassis of the closure respectively; and
   bolts pass through the fixation holes of the elongate body and screw into the threaded bores of the chassis so as to fix the cable fixer to the chassis of the closure.

9. The fiber optic splice protection device comprising:
   a closure including a cover and a chassis; and
   at least one cable fixer for fixing cables to be spliced to the chassis of the closure, wherein the cable fixer is a separate member separated from the chassis, and is removably mounted in the chassis of the closure and the device is configured such that all strength members of the cables to be spliced can be fixed to the cable fixer before the cable fixer is mounted to the chassis of the closure;
   a strength member fixation unit including:
      a box-shaped accommodating portion formed on the surface of the cable fixer, the box-shaped accommodating portion having four walls projecting from the surface of the cable fixer, and strength member holes are formed on the end wall of the box-shaped accommodating portion, a first groove for strength member is formed on the bottom surface of the box-shaped accommodating portion, the strength members of the cables penetrates through the strength member holes and is accommodated in the first groove for strength member; and
      a clamp accommodated in the box-shaped accommodating portion and is fastened to bottom of the box-shaped accommodating portion by the screws, so as to squeeze the strength members penetrated through the strength member holes of the box-shaped accommodating portion into the first groove for strength member,
      wherein the clamp is an integral member for squeezing and fixing the cables to be spliced to the strength members.

10. The fiber optic splice protection device of claim 9, wherein:
    threaded bores are formed on bottom surface of the box-shaped accommodating portion and fixing holes are formed on the clamps, and
    screws pass through the fixing hole of the clamps and screw into the threaded bores of the box-shaped accommodating portion, so as to fasten the clamps to bottom of the box-shaped accommodating portion.

11. The fiber optic splice protection device of claim 10, wherein:
    a second groove for strength member is formed on the clamp, the strength members are squeezed between the first groove for strength member and the second groove for strength member.

12. The fiber optic splice protection device of claim 11, wherein:
    surfaces of the first groove for strength member and/or the second groove for strength member are uneven surfaces so as to increase friction holding force for the strength members.

13. The fiber optic splice protection device comprising:
    a closure including a cover and a chassis; and
    at least one cable fixer for fixing cables to be spliced to the chassis of the closure, wherein the cable fixer is a separate member separated from the chassis, and is removably mounted in the chassis of the closure and the device is configured such that all strength members of the cables to be spliced can be fixed to the cable fixer before the cable fixer is mounted to the chassis of the closure;

a strength member fixation unit including:

a box-shaped accommodating portion, the box-shaped accommodating portion is formed on the surface of the cable fixer, the box-shaped accommodating portion has four walls projecting from the surface of the cable fixer, and strength member holes are formed on the end wall of the box-shaped accommodating portion, a first groove for strength member is formed on the bottom surface of the box-shaped accommodating portion, the strength members of the cables penetrates through the strength member holes and are accommodated in the first groove for strength member; and a clamp, accommodated in the box-shaped accommodating portion and is fastened to bottom of the box-shaped accommodating portion by the screw, so as to squeeze the strength members penetrated through the strength member holes of the box-shaped accommodating portion into the first groove for strength member, wherein the clamps includes a first block and a second block, the first block and the second block are mutually pivotally connected together, and the first block is used to individually squeeze and fix the strength members of the first cable of the cables to be spliced, the second block is used to individually squeeze and fix the strength members of the second cable of the cables to be spliced.

14. The fiber optic splice protection device of claim 13, wherein:
threaded bores are formed on bottom surface of the box-shaped accommodating portion, and fixing holes are formed on the clamps,
screws pass through the fixing hole of the clamps and are screwed into the threaded bores of the box-shaped accommodating portion, so as to fasten the clamps to bottom of the box-shaped accommodating portion.

15. The fiber optic splice protection device of claim 14, wherein:
a second groove for strength member is also formed on the clamps, the strength members are squeezed between the first groove for strength member and the second groove for strength member.

16. The fiber optic splice protection device of claim 15, wherein:
surfaces of the first groove for strength member and/or the second groove for strength member are uneven surfaces so as to increase friction holding force for the strength members.

17. The fiber optic splice protection device of claim 1, wherein:
the fiber optic splice protection device comprises a plurality of cable fixers for fixing cables to be spliced to the chassis of the closure.

* * * * *